United States Patent
Kim et al.

(10) Patent No.: US 11,340,876 B2
(45) Date of Patent: May 24, 2022

(54) METHOD IMPLEMENTED BY PROCESSOR OF ELECTRONIC DEVICE AND PROCESSOR TO OPERATE ELECTRONIC DEVICE FOR HETEROGENEOUS PROCESSORS

(71) Applicant: SAMSUNG ELECTRONICS CO., LTD., Suwon-si (KR)

(72) Inventors: Deok Hwan Kim, Pyeongtaek-si (KR); Seongwoo Ahn, Yongin-si (KR); Soobok Yeo, Suwon-si (KR); Keoncheol Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 375 days.

(21) Appl. No.: 16/687,284

(22) Filed: Nov. 18, 2019

(65) Prior Publication Data
US 2020/0241856 A1    Jul. 30, 2020

(30) Foreign Application Priority Data
Jan. 25, 2019  (KR) .......................... 10-2019-0009814

(51) Int. Cl.
*G06F 8/41*   (2018.01)
*G06N 3/04*   (2006.01)

(52) U.S. Cl.
CPC   *G06F 8/47* (2013.01); *G06N 3/04* (2013.01)

(58) Field of Classification Search
CPC ....................................................... G06F 8/47
See application file for complete search history.

(56) References Cited

U.S. PATENT DOCUMENTS

| | | | |
|---|---|---|---|
| 6,460,178 B1 | 10/2002 | Chan et al. | |
| 6,473,897 B1* | 10/2002 | Ansari | G06F 8/447 |
| | | | 717/136 |
| 7,200,840 B2* | 4/2007 | Gschwind | G06F 9/52 |
| | | | 711/206 |
| 8,296,743 B2 | 10/2012 | Linderman et al. | |

(Continued)

FOREIGN PATENT DOCUMENTS

| | | |
|---|---|---|
| JP | 4872986 B2 | 2/2012 |
| KR | 100176088 B1 | 5/1999 |
| KR | 100968774 B1 | 7/2010 |

*Primary Examiner* — Jae U Jeon
(74) *Attorney, Agent, or Firm* — Volentine, Whitt & Francos, PLLC

(57) ABSTRACT

A method which is implemented by a processor of an electronic device includes receiving a program code directing operations to be processed by heterogeneous processors, receiving libraries to be referenced by the heterogeneous processors for processing the operations, receiving library information associated with attributes of processing the operations based on the libraries, determining processors, which will process the operations, from heterogeneous processors with reference to the library information such that each processor of the heterogeneous processors processes one or more assigned operations of the operations, and compiling sub portions divided from a whole portion of the program code so as to respectively correspond to the determined processors in a state where the sub portions respectively correspond to some libraries to be referenced by the determined processors.

20 Claims, 22 Drawing Sheets

(56) References Cited

U.S. PATENT DOCUMENTS

| | | |
|---|---|---|
| 9,501,227 B2 | 11/2016 | Wang et al. |
| 9,557,975 B2 | 1/2017 | Angerer et al. |
| 9,841,958 B2 | 12/2017 | Ringseth |
| 10,088,837 B1 * | 10/2018 | Strain .............. G05B 19/41865 |
| 11,036,546 B1 * | 6/2021 | Bhandari .............. G06F 9/4881 |
| 2016/0364220 A1 | 12/2016 | Arai |

* cited by examiner

```
Class Name1 {
    .
    .
    .
}

Float Name2(..., ...) {
    .
    .
    .
}

.
        .
        .

Void Main() {
    .
    .
    .
}
```

FIG. 20

| Sub-portion | Library |
|---|---|
| DV1 | Libraries to be referenced to process N2, N7 by main processor |
| DV2 | Libraries to be referenced to process N5, N6 by graphic processor |
| DV3 | Libraries to be referenced to process N3, N4 by neural processor |
| DV4 | Libraries to be referenced to process N1, N8, N9 by digital signal processor |

METHOD IMPLEMENTED BY PROCESSOR OF ELECTRONIC DEVICE AND PROCESSOR TO OPERATE ELECTRONIC DEVICE FOR HETEROGENEOUS PROCESSORS

CROSS-REFERENCE TO RELATED APPLICATIONS

This application claims priority under 35 U.S.C. § 119 to Korean Patent Application No. 10-2019-0009814 filed on Jan. 25, 2019, in the Korean Intellectual Property Office, the disclosure of which is incorporated by reference herein in its entirety.

BACKGROUND

The present disclosure relates to a processor of an electronic device, and more particularly, relates to operations of a processor for heterogeneous processors.

Nowadays, various types of electronic devices are being used. An electronic device performs unique functions depending on operations of various electronic circuits and/or various electronic devices included in the electronic device. For example, a processor circuit or device is configured to process various arithmetic/logical/special operations for the purpose of providing the functions of the electronic device.

As information processing technologies develop, a large amount of data is generated and various types of data are used. In this regard, various kinds of processors are developed to process information and data appropriately, and the electronic device adopts different types of processors, that is, heterogeneous processors to provide services of optimized performance. The heterogeneous processors may be specialized to process general-purpose operations or special operations, thus having different configurations and supporting different operations.

Some types of processors are configured to execute instructions of software and process operations. A developer may compile a program code written to process intended operations to generate an output including executable instructions, and processors may execute the instructions based on the output. Meanwhile, as kinds of processors are diversified, to design a program code and instructions in consideration of characteristics and configurations of all the heterogeneous processors is an important issue.

SUMMARY

Embodiments of the present disclosure provide a method implemented by a processor for the purpose of generating a compiler output executable by heterogeneous processors with reference to information associated with the heterogeneous processors and a processor operating by using the method.

In some embodiments, a method which is implemented by a processor of an electronic device may include receiving a program code directing first operations to be processed by heterogeneous processors, receiving libraries to be referenced by the heterogeneous processors for the purpose of processing the first operations, receiving library information including information associated with the operations to be processed based on the libraries and information associated with attributes of processing the first operations based on the libraries, determining processors, which will process the operations, from the heterogeneous processors with reference to the library information such that each processor of the heterogeneous processors processes one or more assigned operations of the first operations, and compiling sub portions divided from a whole portion of the program code so as to respectively correspond to the determined processors in a state where the sub portions respectively correspond to some libraries, which are to be referenced by the determined processors for the purpose of processing assigned operations, from among the libraries.

In some embodiments, a processor for operating an electronic device may execute instructions of a heterogeneous compiler stored in a memory to map operations onto heterogeneous processors in consideration of attributes of processing the operations by the heterogeneous processors, such that each of the operations is processed by a mapped processor of the heterogeneous processors, to divide a whole portion of a program code directing the operations to be processed by the heterogeneous processors into sub portions respectively corresponding to the heterogeneous processors based on one or more operations mapped onto each of the heterogeneous processors, and to compile the divided sub portions in a state where the divided sub portions respectively correspond to libraries to be referenced by the heterogeneous processors for the purpose of processing the operations.

In some embodiments, a method which is implemented by a processor of an electronic device may include receiving a program code directing operations to be processed by heterogeneous processors, compiling sub portions divided from a whole portion of the program code so as to respectively correspond to the heterogeneous processors based on one or more operations of the operations assigned to each of the heterogeneous processors, in a state where the sub portions correspond, in a first manner, to libraries to be referenced by the heterogeneous processors for the purpose of processing the operations, such that each processor of the heterogeneous processors processes the one or more assigned operations of the operations, and compiling the sub portions in a state where the sub portions respectively correspond to the libraries in the first manner, to generate a first compiler output such that at least a part of the heterogeneous processors operate in parallel for the purpose of processing the operations.

In some embodiments, a method which is implemented by a processor of an electronic device may receive a program code directing operations to be processed by heterogeneous processors, receive library information associated with attributes of processing the operations by the heterogeneous processors, and, with reference to the library information, compile sub portions, which are divided from a whole portion of the program code so as to respectively correspond to the heterogeneous processors, in a state where the sub portions respectively correspond to libraries to be referenced by the heterogeneous processors for the purpose of processing the operations, based on one or more operations of the operations assigned to each of the heterogeneous processors such that each processor of the heterogeneous processors processes the one or more assigned operations of the operations, to generate a compiler output.

The compiler output may include correspondence relationships between the libraries and data to be referenced for the purpose of executing instructions of the libraries with regard to each of the heterogeneous processors.

In some embodiments, a method executed by a processor includes receiving program code and compiling the program code into compiled code containing instructions directing a first processor to execute a first portion of the compiled code and directing a second processor, which is heterogeneous with the first processor, to execute a second portion of the compiled code.

BRIEF DESCRIPTION OF THE FIGURES

The above and other objects and features of the disclosure will become apparent by describing in detail example embodiments thereof with reference to the accompanying drawings.

FIGS. 6 and 7 are conceptual diagrams illustrating examples of a program code of FIG. 5.

FIGS. 19 and 20 are conceptual diagrams for describing an exemplary compile by a heterogeneous compiler of FIG. 5.

DETAILED DESCRIPTION

Below, some embodiments will be described in detail and clearly with reference to the accompanying drawings to such an extent that one skilled in the art easily implements the disclosure.

I. Heterogeneous Processors

Figure 1:
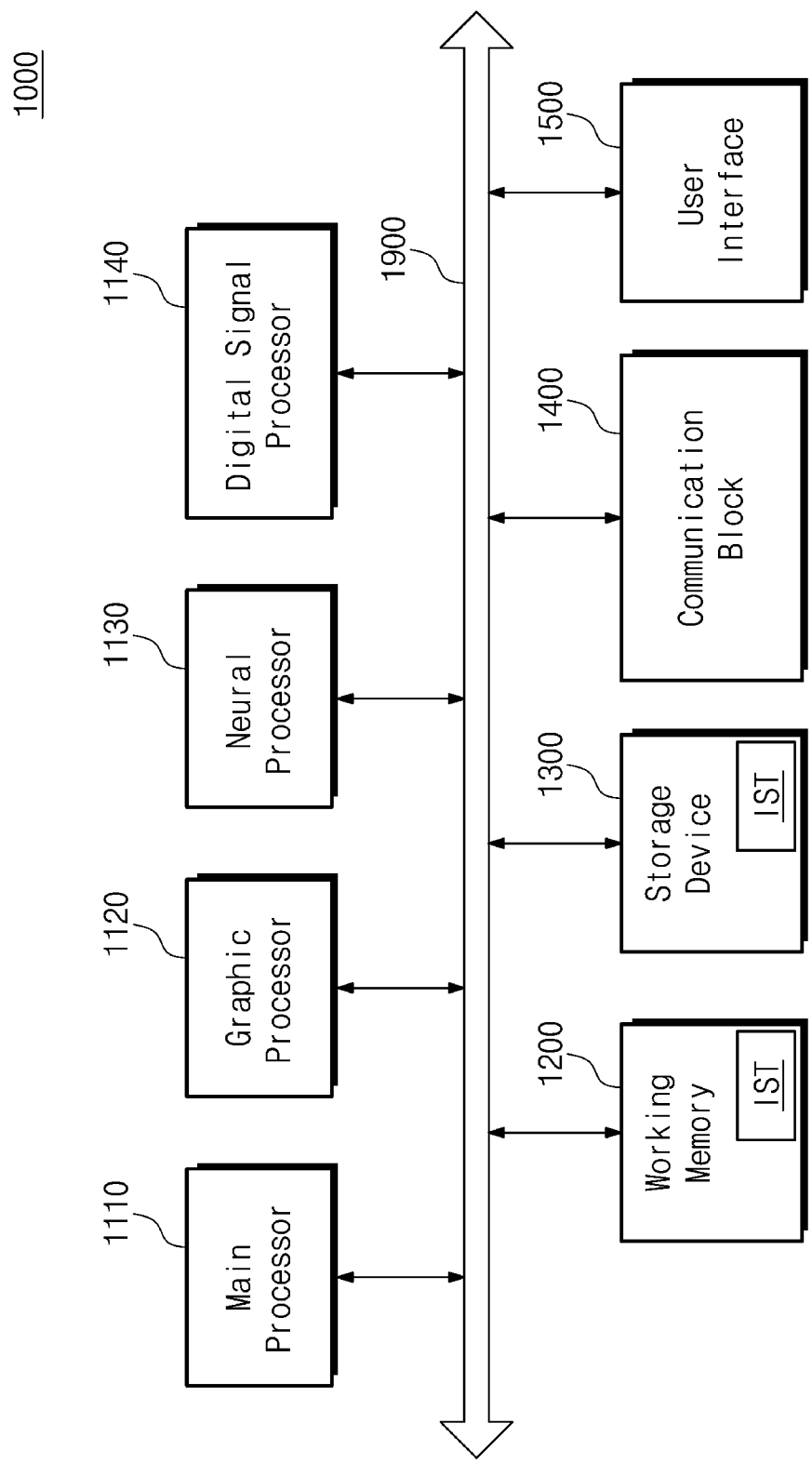
FIG. 1 is a block diagram illustrating an example configuration of an electronic system including heterogeneous processors according to some embodiments.

FIG. 1 is a block diagram illustrating an example configuration of an electronic system 1000 including heterogeneous processors 1110, 1120, 1130, and 1140 according to some embodiments.

For example, the electronic system 1000 may include a main processor 1110, a graphic processor 1120, a neural processor 1130, a digital signal processor 1140, a working memory 1200, a storage device 1300, a communication block 1400, a user interface 1500, and a bus 1900. For example, the electronic system 1000 may be one of electronic devices such as a desktop computer, a laptop computer, a tablet computer, a smartphone, a wearable device, a video game console, a workstation, a server, an electric vehicle, home appliances, a medical device, etc.

The main processor 1110 may control overall operations of the electronic system 1000. The main processor 1110 may include one or more processor cores configured to process various arithmetic/logical operations. The main processor 1110 may be implemented with a general-purpose processor such as a central processing unit (CPU) or an application processor (AP).

The graphic processor 1120 may be implemented with a dedicated processor, which may quickly process a large amount of graphic data, such as a graphic processing unit (GPU). The graphic processor 1120 may be configured to perform various graphic-related operations (e.g., shader, supersampling, and space translation) on graphic data in a parallel pipeline manner.

The neural processor 1130 may be implemented with a dedicated processor, which is specialized to quickly process a large amount of data associated with a neural network, such as a neural processing unit (NPU). For example, the neural processor 1130 may be implemented by an architecture that is optimized to process operations (e.g., convolution and pooling) for a convolution neural network.

The digital signal processor 1140 may be designed to be optimized to perform various logical operations on a digital signal. For example, the digital signal processor 1140 may be implemented with a general-purpose processor, which may provide various signal processing, or a dedicated processor such as an image signal processor (ISP) or a video encoder/decoder (CODEC).

The working memory 1200 may store data to be used for an operation of the electronic system 1000. For example, the working memory 1200 may temporarily store data that is processed or will be processed by the processors 1110, 1120, 1130, and 1140. For example, the working memory 1200 may include a volatile memory such as a static random-access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 1300 may store data regardless of whether power is supplied. For example, the storage device 1300 may include a nonvolatile memory such as a flash memory, a PRAM, an MRAM, a ReRAM, or a FRAM. For example, the storage device 1300 may include a storage medium such as a solid-state drive (SSD), card storage, or embedded storage.

The communication block 1400 may communicate with an external device/system of the electronic system 1000 in compliance with at least one of various wired/wireless communication protocols. The user interface 1500 may include various input/output interfaces (e.g., a keyboard, a touchscreen, and a display device) for the purpose of arbitrating communication between a user and the electronic system 1000.

The bus 1900 may provide a communication path between the components of the electronic system 1000. The components of the electronic system 1000 may exchange data with each other in compliance with a bus format of the bus 1900. For example, the bus format may include one or more of various interface protocols such as universal serial bus (USB), small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), nonvolatile memory express (NVMe), universal flash storage (UFS), and Firewire.

As described with reference to FIG. 1, the electronic system 1000 may adopt different types of processors or heterogeneous processors 1110, 1120, 1130, and 1140. The processors 1110, 1120, 1130, and 1140 may be differently configured and may differently operate. For example, the processors 1110, 1120, 1130, and 1140 may be implemented to support different architectures (e.g., different ISAs (Instruction Set Architectures)). For example, the processors 1110, 1120, 1130, and 1140 may operate with different performances.

Some of the processors 1110, 1120, 1130, and 1140 may be specialized to process general-purpose operations, and the others may be specialized to process special operations. The processors 1110, 1120, 1130, and 1140 may respectively process given operations in optimum manners, and thus, the electronic system 1000 may provide services of optimized performance.

However, the processors 1110, 1120, 1130, and 1140 are provided for better understanding and are not intended to limit the present disclosure. The electronic system 1000 may not include one or more of the processors 1110, 1120, 1130, and 1140 or may further include any other processor in addition to the processors 1110, 1120, 1130, and 1140. A heterogeneous processor may be variously changed or modified according to the implementation of the electronic system 1000.

For example, the working memory 1200 and/or a nonvolatile memory of the storage device 1300 may store instructions IST. The instructions IST may be executed by all or a part of the processors 1110, 1120, 1130, and 1140 for the purpose of processing intended operations. The instructions IST will be described with reference to FIGS. 2 to 4.

Figure 2:
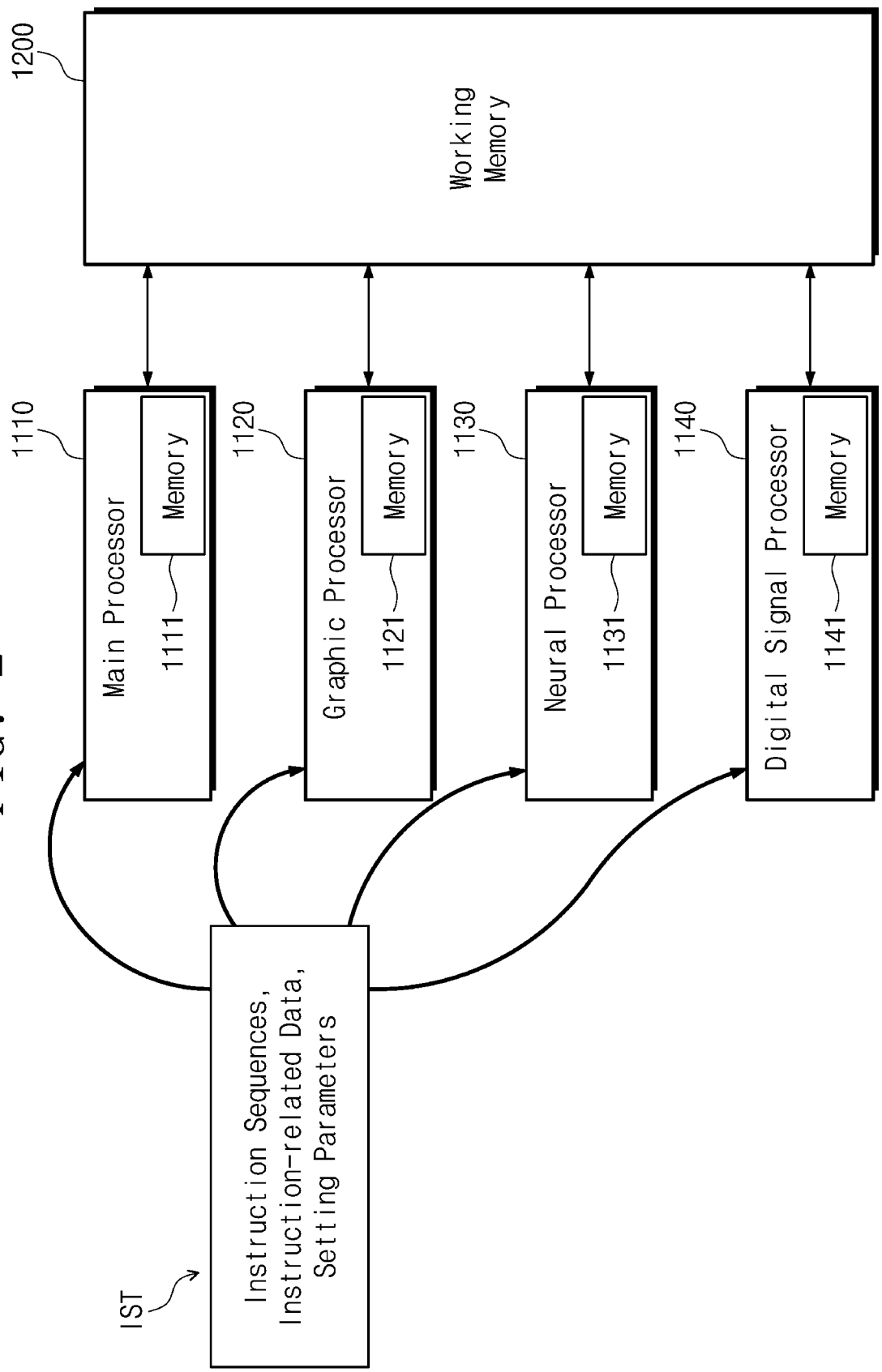
FIG. 2 is a block diagram for describing example configurations and operations of heterogeneous processors of FIG. 1.

FIG. 2 is a block diagram for describing example configurations and operations of the heterogeneous processors 1110, 1120, 1130, and 1140 of FIG. 1.

The processors 1110, 1120, 1130, and 1140 may execute the instructions IST to process operations. For example, the instructions IST may include instruction sequences, instruction-related data, and setting parameters.

For example, the instruction sequences may direct whether any instruction sets of the processors 1110, 1120, 1130, and 1140 are executed to process intended operations or whether any circuits of the processors 1110, 1120, 1130, and 1140 operate to process the intended operations.

For example, the instruction-related data may include data (e.g., a constant value and a global common value) to be used by the processors 1110, 1120, 1130, and 1140 while the intended operations are processed.

For example, the setting parameters may include values for setting operating conditions (e.g., circuit enable/disable, connection/disconnection between circuits, and an iterative operation count) of the processors 1110, 1120, 1130, and 1140, which are appropriate to process the intended operations.

However, the above descriptions are provided for better understanding and the configuration of the instructions IST is not intended to limit the above descriptions. The instructions IST may be variously changed or modified to be appropriate to process operations by the processors 1110, 1120, 1130, and 1140.

The processors 1110, 1120, 1130, and 1140 may process the intended operations based on the instructions IST. For example, with reference to the instruction-related data, the processors 1110, 1120, 1130, and 1140 may execute the instruction sets directed by the instruction sequences or may operate the circuits directed by the instruction sequences. For example, the processors 1110, 1120, 1130, and 1140 may operate in operating conditions provided based on the values of the setting parameters.

The processors 1110, 1120, 1130, and 1140 may include internal memories 1111, 1121, 1131, and 1141, respectively. Each of the internal memories 1111, 1121, 1131, and 1141 may be used as a buffer memory or a cache memory and may be implemented with various types of memory devices such as a read-only memory (ROM), a RAM, and a register. The internal memories 1111, 1121, 1131, and 1141 may store data that are used in the processors 1110, 1120, 1130, and 1140.

For example, the processors 1110, 1120, 1130, and 1140 may share the working memory 1200 through a direct memory access (DMA) function. The working memory 1200 may store data that are transferred or shared between the processors 1110, 1120, 1130, and 1140.

For example, data output from the main processor 1110 may be stored in the working memory 1200. The graphic processor 1120 may read data of the working memory 1200 and may store the read data in the internal memory 1121, and thus, the graphic processor 1120 may use data output from the main processor 1110.

II. Implementations of Heterogeneous Compilers

Figure 3:
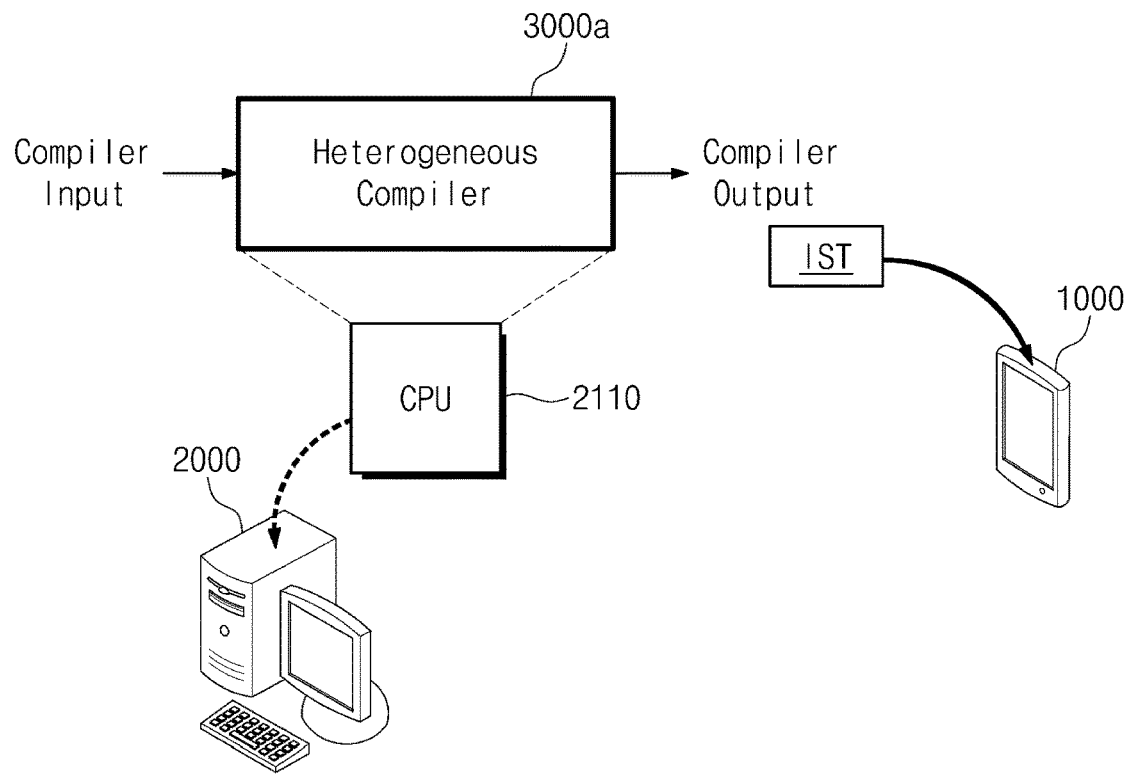
FIGS. 3 and 4 are conceptual diagrams for describing example ways to generate a compiler output including instructions executable by heterogeneous processors of FIG. 1.
Figure 4:
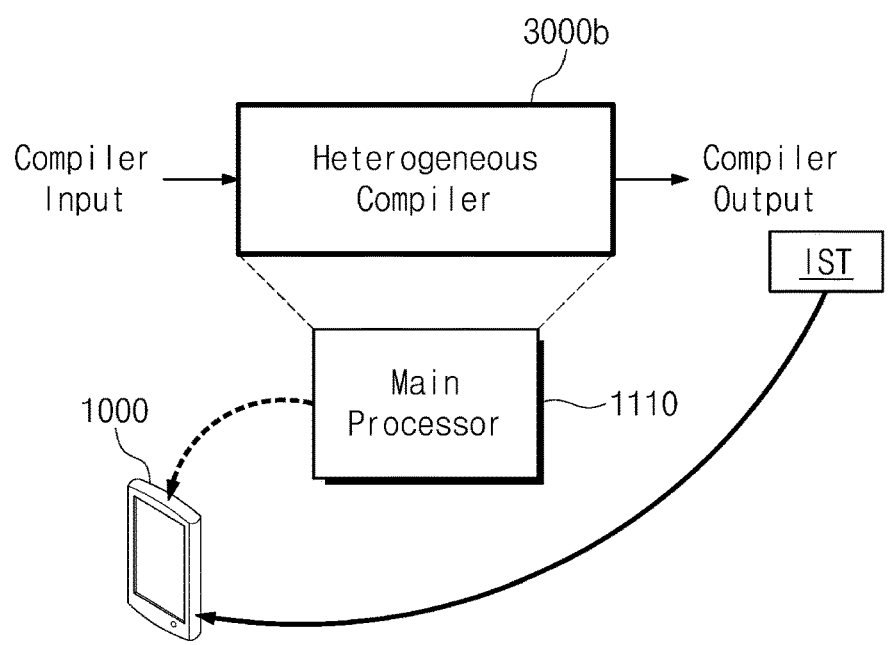

FIGS. 3 and 4 are conceptual diagrams for describing example ways to generate a compiler output including instructions IST executable by the heterogeneous processors 1110, 1120, 1130, and 1140 of FIG. 1.

Referring to FIG. 3, for example, a designer or a developer may use a development system 2000 for the purpose of providing operations to be processed in the electronic system 1000. For example, the development system 2000 may be one of a desktop computer, a laptop computer, a tablet computer, a smartphone, a workstation, etc.

For example, the development system 2000 may include a CPU 2110 that may execute instructions of software and/or firmware. However, a type of a processor included in the development system 2000 may be variously changed or modified without limitation to the CPU 2110. The CPU 2110 may execute instructions of a heterogeneous compiler 3000*a* in response to a command of the designer or the developer. The instructions of the heterogeneous compiler 3000*a* may be stored in a memory of the development system 2000.

The heterogeneous compiler 3000*a* may compile a compiler input entered to the heterogeneous compiler 3000*a* by the designer or the developer and may generate a compiler output. Here, the compile may mean the process of transforming a compiler input capable of being comprehended by the designer or the developer into a compiler output having a format executable by a machine (e.g., an electronic device such as the electronic system 1000 or the development system 2000).

The compiler output generated from the heterogeneous compiler 3000*a* may include the instructions IST. The instructions IST may be provided to the electronic system 1000 and may be executed by the heterogeneous processors 1110, 1120, 1130, and 1140 of the electronic system 1000. In the example of FIG. 3, the instructions IST may be generated based on the heterogeneous compiler 3000a at the development system 2000 independent of the electronic system 1000 in which the instructions IST will be executed.

Referring to FIG. 4, for example, the main processor 1110 may execute instructions of a heterogeneous compiler 3000b in response to a request of the user of the electronic system 1000 or in response to a request based on an operating policy of the electronic system 1000. However, a processor that executes the instructions of the heterogeneous compiler 3000b may be variously changed or modified without limitation to the main processor 1110.

For example, the heterogeneous compiler 3000b may be an embedded compiler that is stored in a memory of the electronic system 1000. The heterogeneous compiler 3000b may compile a compiler input entered to the heterogeneous compiler 3000b by the user or the electronic system 1000 and may generate a compiler output.

The compiler output generated from the heterogeneous compiler 3000b may include the instructions IST. The instructions IST may be executed by the heterogeneous processors 1110, 1120, 1130, and 1140 of the electronic system 1000. In the example of FIG. 4, the instructions IST may be generated based on the heterogeneous compiler 3000b in the electronic system 1000 in which the instructions IST will be executed. In addition to the descriptions given with reference to FIGS. 3 and 4, a way to generate the instructions IST may be variously changed or modified.

Only in consideration of a single processor, some compilers may compile a compiler input to generate a compiler output, and the compiler output may include only instructions optimized to the single processor. However, in the electronic system 1000 including the heterogeneous processors 1110, 1120, 1130, and 1140, using a compiler output optimized to a single processor may not be advantageous and efficient.

Accordingly, in embodiments, in consideration of characteristics and attributes of all the heterogeneous processors 1110, 1120, 1130, and 1140, the heterogeneous compiler 3000a or 3000b may compile a compiler input to generate a compiler output. In the embodiments, the compiler output may include instructions optimized to each of the heterogeneous processors 1110, 1120, 1130, and 1140, and may allow the electronic system 1000 to operate efficiently.

In addition, to generate a compiler output, the heterogeneous compiler 3000a or 3000b may receive a compiler input including information associated with the heterogeneous processors 1110, 1120, 1130, and 1140. Accordingly, even though the heterogeneous processors 1110, 1120, 1130, and 1140 are not designed in compliance with a unified specification or protocol, the heterogeneous compiler 3000a or 3000b may generate a compiler output appropriate for all the heterogeneous processors 1110, 1120, 1130, and 1140 with reference to the compiler input.

Examples associated with a compiler input, operations of the heterogeneous compiler 3000a or 3000b, and a compiler output will be described with reference to FIGS. 5 to 24.

Figure 5:
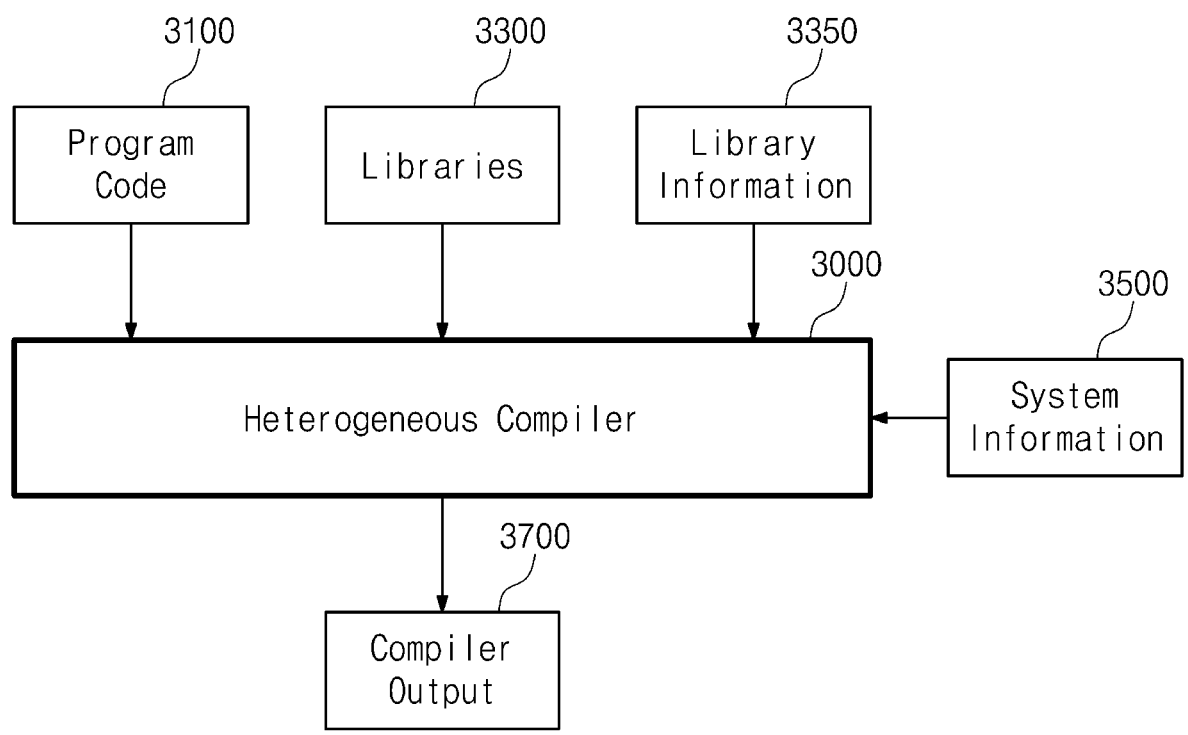
FIG. 5 is a block diagram for describing example operations of a heterogeneous compiler of FIG. 3 or 4 according to embodiments.

FIG. 5 is a block diagram for describing example operations of the heterogeneous compiler 3000a or 3000b of FIG. 3 or 4 according to embodiments.

A heterogeneous compiler 3000 of FIG. 5 may correspond to the heterogeneous compiler 3000a of FIG. 3 and/or the heterogeneous compiler 3000b of FIG. 4. The heterogeneous compiler 3000 may be implemented by a processor (e.g., the processor 1110, 1120, 1130, 1140, and/or 2110) of an electronic device. It may be well understood that operations that are described with regard to the heterogeneous compiler 3000 in the present disclosure may be regarded as operations associated with a processor (e.g., the processor 1110, 1120, 1130, 1140, and/or 2110) for operating an electronic device.

In some embodiments, the heterogeneous compiler 3000 may receive one or more of a program code 3100, libraries 3300, library information 3350, and system information 3500 as a compiler input. However, the present disclosure is not limited thereto, and the compiler input may be variously changed or modified to be appropriate for the heterogeneous compiler 3000. The heterogeneous compiler 3000 may compile a compiler input and may generate a compiler output 3700 as a result of the compile.

III. Compiler Input to Heterogeneous Compiler

Figure 6:
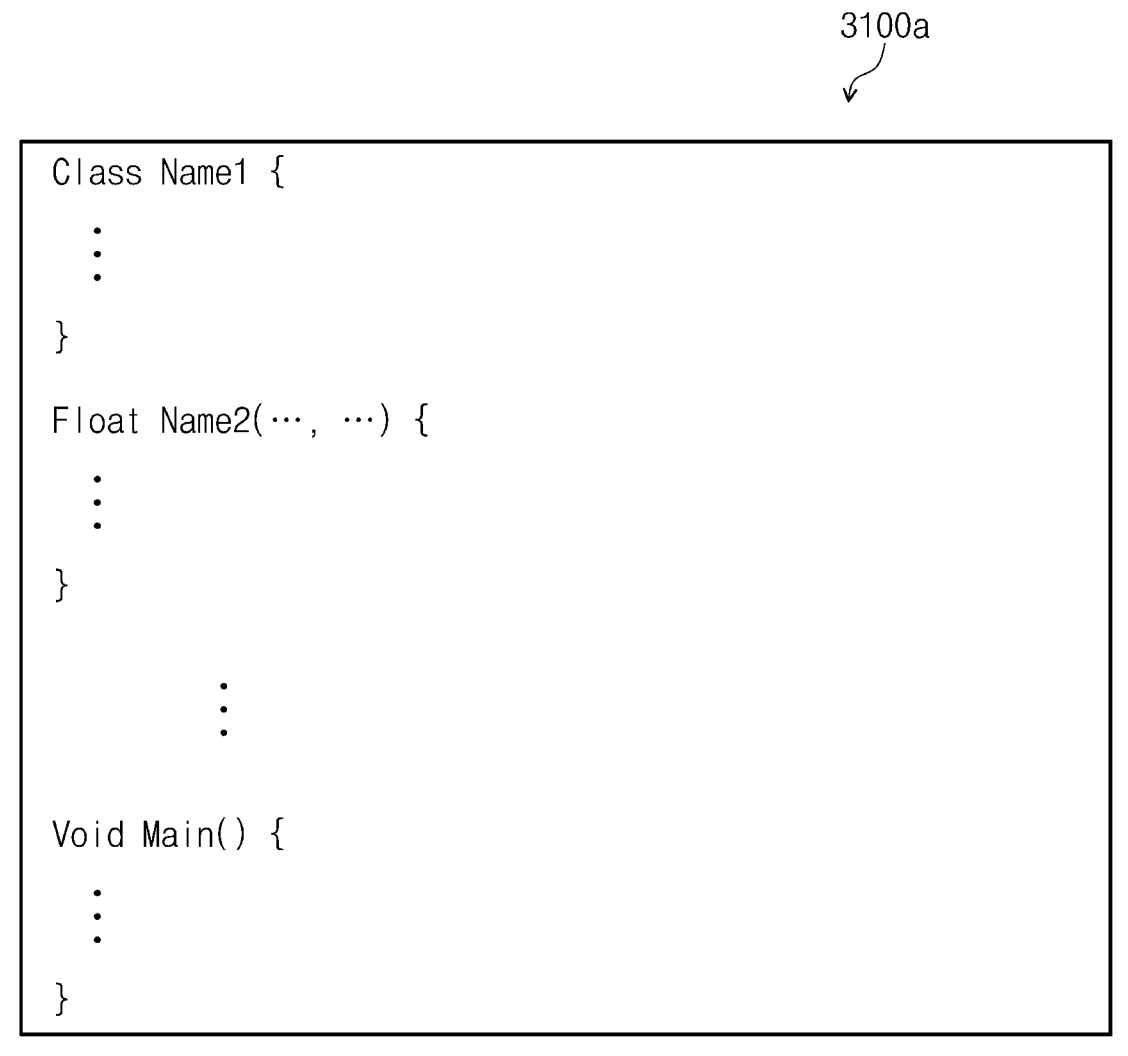
Figure 7:
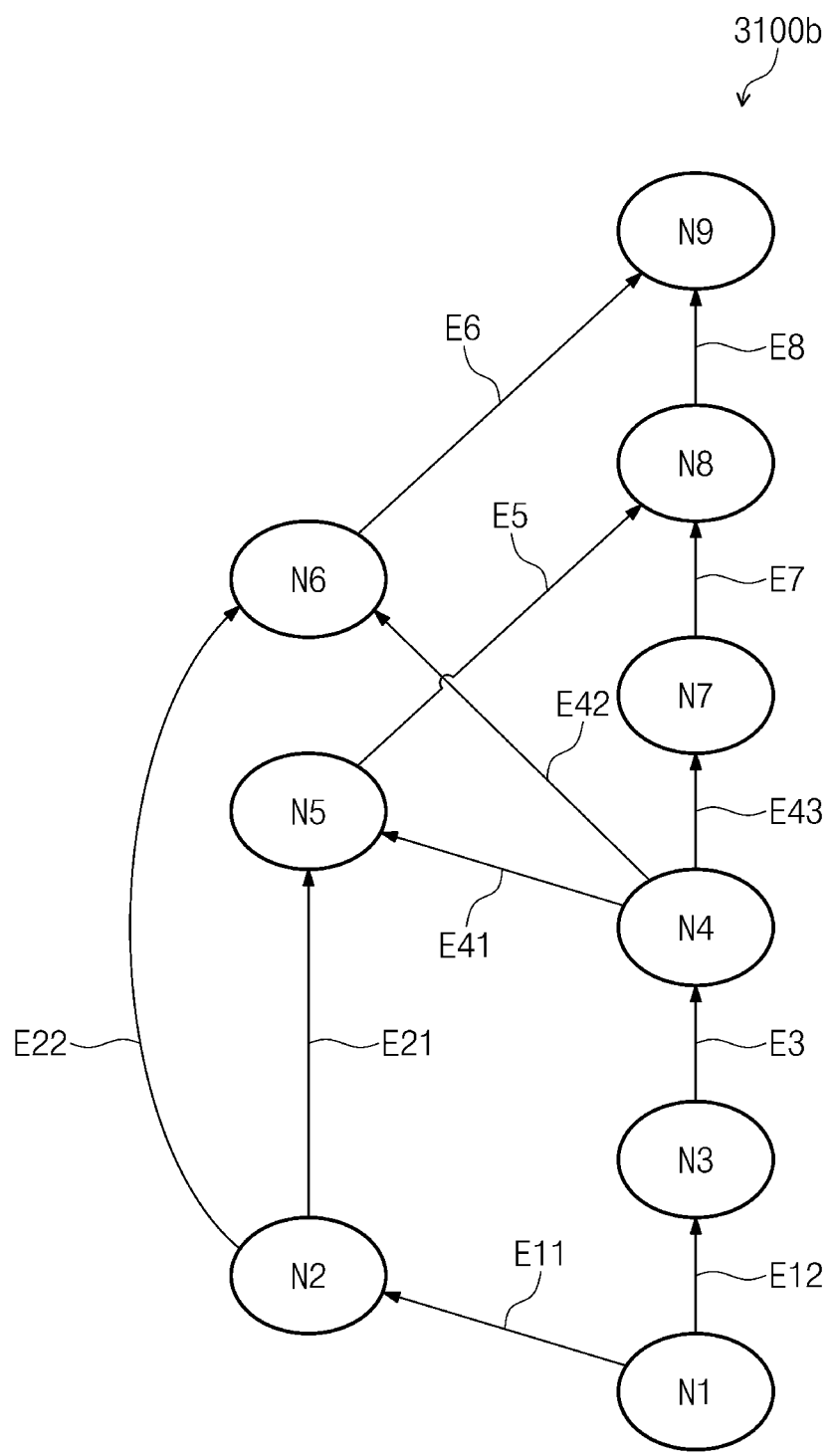

FIGS. 6 and 7 are conceptual diagrams illustrating examples of the program code of FIG. 5.

The program code 3100 may direct operations to be processed by the heterogeneous processors 1110, 1120, 1130, and 1140. The heterogeneous compiler 3000 may receive the program code 3100 as a compiler input.

For example, the designer or the developer may write the program code 3100 in a language that is comprehensible by the designer or the developer. The designer or the developer may input the program code 3100 to the heterogeneous compiler 3000a through the development system 2000 or may input the program code 3100 to the heterogeneous compiler 3000b through the user interface 1500.

Referring to FIG. 6, for example, the program code 3100 may include a program code 3100a written in a high-level language (e.g., a C language). For example, the program code 3100a may be written to describe modules such as variables, classes, and functions associated with operations to be processed by the heterogeneous processors 1110, 1120, 1130, and 1140.

Alternatively, referring to FIG. 7, the program code 3100 may be written in a graph-based language (e.g., a TensorFlow) that may provide visualization of a graph structure 3100b. For example, the graph structure 3100b may include nodes N1 to N9 and edges E11 to E8.

Each of the nodes N1 to N9 may correspond to a unit operation directed by the program code 3100 visualized as the graph structure 3100b. For example, in the case where the graph structure 3100b is intended to express a configuration of a convolution neural network and the heterogeneous processors 1110, 1120, 1130, and 1140 are intended to process operations for the convolution neural network, each of the nodes N1 to N9 may correspond to a convolution operation or a pooling operation.

Each of the edges E11 to E8 may mean an input-output relationship between unit operations. For example, the edge E11 may mean that an output of an operation corresponding to the node N1 is used as an input of an operation corresponding to the node N2.

FIGS. 6 and 7 show only examples of the program code 3100 and are not intended to limit the present disclosure. The program code 3100 may be changed or modified differently from the examples illustrated in FIGS. 6 and 7 for the purpose of directing operations to be processed by the heterogeneous processors 1110, 1120, 1130, and 1140. However, for better understanding, the following descriptions may be provided with regard to processing the operations for the convolution neural network expressed by the graph structure 3100b of FIG. 7.

Figure 8:
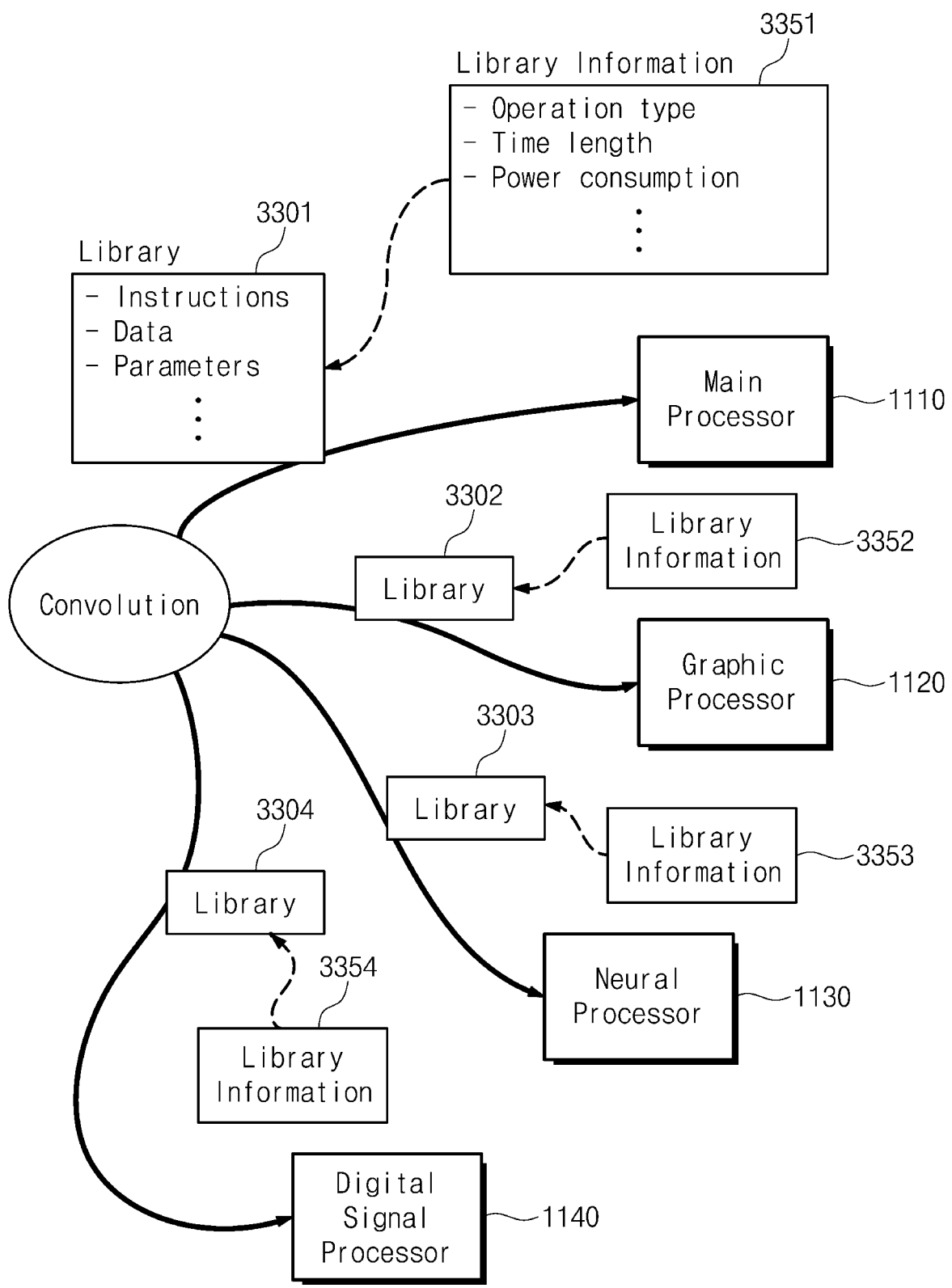
FIG. 8 is a conceptual diagram illustrating examples of libraries and library information of FIG. 5.

FIG. 8 is a conceptual diagram illustrating examples of the libraries 3300 and the library information 3350 of FIG. 5.

The libraries 3300 may be referenced by the heterogeneous processors 1110, 1120, 1130, and 1140 for the purpose of processing operations directed by the program code 3100. The heterogeneous compiler 3000 may receive the libraries 3300 as a compiler input.

For example, the libraries 3300 may include libraries 3301, 3302, 3303, and 3304. The libraries 3301, 3302, 3303, and 3304 may be provided to correspond to the heterogeneous processors 1110, 1120, 1130, and 1140, respectively. Each of the libraries 3301, 3302, 3303, and 3304 may include instructions that are executed by one of the heterogeneous processors 1110, 1120, 1130, and 1140 for the purpose of processing the operations directed by the program code 3100.

For example, the library 3301 may include instructions that are executed by the main processor 1110 for the purpose of processing a convolution operation. In addition, the library 3301 may include data (e.g., a constant and a global common value) that are used by the main processor 1110 while the convolution operation is processed. In some cases, the library 3301 may include parameters for setting an operating condition of the main processor 1110, which is appropriate to process the convolution operation.

Each of the libraries 3302, 3303, and 3304 may be configured to be similar to the library 3301 For example, the processors 1120, 1130, and 1140 may refer to instructions, instruction-related data, and setting parameters of the libraries 3302, 3303, and 3304 for the purpose of processing the convolution operation.

As such, the libraries 3301, 3302, 3303, and 3304 may direct whether the processors 1110, 1120, 1130, and 1140 execute any instructions for the purpose of performing the convolution operation. The libraries 3301, 3302, 3303, and 3304 may be prepared in advance before a compile of the heterogeneous compiler 3000 is performed.

For example, the libraries 3301, 3302, 3303, and 3304 may be object programs (e.g., binary codes and assembly codes) that are compiled in advance before being input to the heterogeneous compiler 3000. Alternatively, the libraries 3301, 3302, 3303, and 3304 may be source programs that are written in a language comprehensible by the designer or the developer and is not compiled.

For example, in the case where an operating system or a framework of the development system 2000 or the electronic system 1000 includes individual compilers for the individual processors 1110, 1120, 1130, and 1140, it may be acceptable that each of the libraries 3301, 3302, 3303, and 3304 is provided in the form of a source program not compiled.

In contrast, in the case where the operating system or the framework of the development system 2000 or the electronic system 1000 does not include individual compilers, each of the libraries 3301, 3302, 3303, and 3304 may be provided in the form of a compiled object program.

The heterogeneous compiler 3000 may receive the library information 3350 as a compiler input. For example, the library information 3350 may include library information 3351, 3352, 3353, and 3354. The library information 3351, 3352, 3353, and 3354 may be received to correspond to the libraries 3301, 3302, 3303, and 3304 in a one-to-one relationship.

The library information 3351, 3352, 3353, and 3354 may include information associated with operations to be processed based on the libraries 3301, 3303, 3302, and 3304. For example, the library information 3350 may include information about a type of an operation to be processed with reference to the library 3301 by the main processor 1110. For example, the library information 3350 may direct that the convolution operation is processed based on the library 3301.

The library information 3351, 3352, 3353, and 3354 may include information associated with attributes of processing operations based on the libraries 3301, 3302, 3303, and 3304. For example, the library information 3351 may include information about the amount of power to be consumed to process the convolution operation with reference to the library 3301 by the main processor 1110, information about a time necessary to process the convolution operation with reference to the library 3301 by the main processor 1110, etc.

For example, the library information 3351 may include information about the amount of power expected to be consumed to process the convolution operation with reference to the library 3301 by the main processor 1110, information about a time expected to be necessary to process the convolution operation with reference to the library 3301 by the main processor 1110, etc. For example, information about a power and a time may be collected during an experiment, a test, and/or a simulation for the heterogeneous processors 1110, 1120, 1130, and 1140, or may be collected during an actual operation of the electronic system 1000.

The present disclosure is not limited to the above descriptions, and the library information 3351 may include a variety of information in addition to the information about the power and the time. The library information 3351 may include various descriptions on an operation to be processed based on the library 3301 for the purpose of specifying the library 3301.

The libraries 3352, 3353, and 3354 may be configured to be similar to the library 3351. For example, the library information 3352, 3353, and 3354 may include various descriptions on operations to be processed based on the libraries 3302, 3303, and 3304 for the purpose of specifying the libraries 3302, 3303, and 3304.

The library information 3351, 3352, 3353, and 3354 may be prepared in advance before a compile of the heterogeneous compiler 3000 is performed. For example, the library information 3351, 3352, 3353, and 3354 may be input to the heterogeneous compiler 3000 in advance before an actual runtime of the heterogeneous processors 1110, 1120, 1130, and 1140.

For example, the library information 3351, 3352, 3353, and 3354 may be data written by the designer or the developer. Alternatively, the library information 3351, 3352, 3353, and 3354 may be generated by the development system 2000 or the electronic system 1000 based on an experiment, a test, and/or a simulation for the heterogeneous processors 1110, 1120, 1130, and 1140 or based on information collected during an actual operation of the electronic system 1000.

The convolution operation is described with reference to FIG. 8, but the libraries 3300 and the library information 3350 described with reference to FIG. 8 may also be provided with respect to another type of operation. For example, the libraries 3300 may further include libraries to be referenced by the processors 1110, 1120, 1130, and 1140 for the purpose of processing a pooling operation. For example, the library information 3350 may include various descriptions associated with processing the pooling operation based on libraries associated with the pooling operation.

The libraries 3300 and the library information 3350 may be given to be appropriate for the heterogeneous processors 1110, 1120, 1130, and 1140. For example, in the case where a design of any processor of the heterogeneous processors 1110, 1120, 1130, and 1140 is changed or modified, the designer, the developer, the development system 2000, and/or the electronic system 1000 may modify the libraries 3300 and the library information 3350 to be appropriate for the changed or modified design of the processor.

For example, in the case where any processor of the heterogeneous processors 1110, 1120, 1130, and 1140 is removed or is replaced with any other processor, the designer, the developer, the development system 2000, and/or the electronic system 1000 may modify the libraries 3300 and the library information 3350 to be appropriate for the changed heterogeneous processor.

In addition, in the case where a new processor is added to the heterogeneous processors 1110, 1120, 1130, and 1140 or in the case where a new type of operation is added, the designer, the developer, the development system 2000, and/or the electronic system 1000 may further input libraries and library information appropriate for new requirements to the heterogeneous compiler 3000.

As such, a library and library information may be newly generated or may be modified/updated, and thus, design flexibility and expandability for the heterogeneous processors 1110, 1120, 1130, and 1140 may be provided. The heterogeneous compiler 3000 may perform a compile to be described below, with reference to libraries and library information appropriate for a given system condition. According to embodiments, even though the heterogeneous compiler 3000 is not modified, it may be possible to flexibly cope with a change in the heterogeneous processors 1110, 1120, 1130, and 1140 by appropriately configuring a library and library information.

Figure 9:
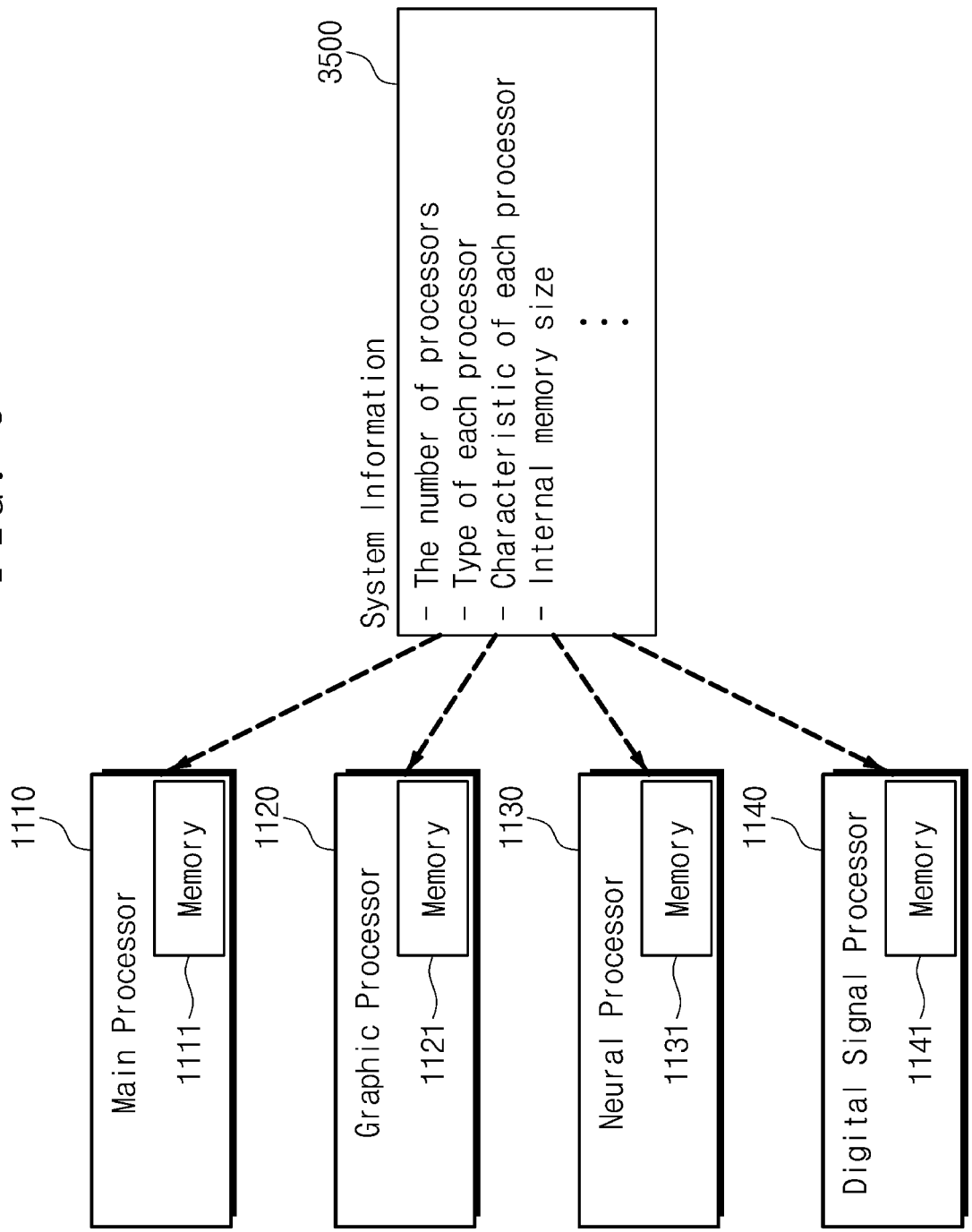
FIG. 9 is a block diagram illustrating an example of system information of FIG. 5.

FIG. 9 is a block diagram illustrating an example of system information 3500 of FIG. 5.

The system information 3500 may include information associated with attributes of the heterogeneous processors 1110, 1120, 1130, and 1140. The heterogeneous compiler 3000 may receive the system information 3500 as a compiler input.

For example, the system information 3500 may include information of the number of heterogeneous processors included in the electronic system 1000. For example, the system information 3500 may include a variety of information such as a kind, a characteristic (e.g., a performance, an operating frequency, or an operating voltage), a size of an internal memory of each of the heterogeneous processors 1110, 1120, 1130, and 1140. The present disclosure is not limited thereto, and the system information 3500 may include a variety of information to be referenced for the purpose of recognizing the attributes of the heterogeneous processors 1110, 1120, 1130, and 1140.

The system information 3500 may be prepared in advance before a compile of the heterogeneous compiler 3000 is performed. For example, the system information 3500 may be data written by the designer or the developer. To this end, the designer or the developer may in advance know information associated with the heterogeneous processors 1110, 1120, 1130, and 1140 to be adopted to the electronic system 1000. Alternatively, the system information 3500 may be generated by the electronic system 1000 during booting or initialization of the electronic system 1000.

A compiler input to the heterogeneous compiler 3000 is described with reference to FIGS. 6 to 9. Below, an example compile that is performed based on a compiler input by the heterogeneous compiler 3000 will be described with reference to FIGS. 10 to 20.

IV. Operations of Heterogeneous Compiler

Figure 10:
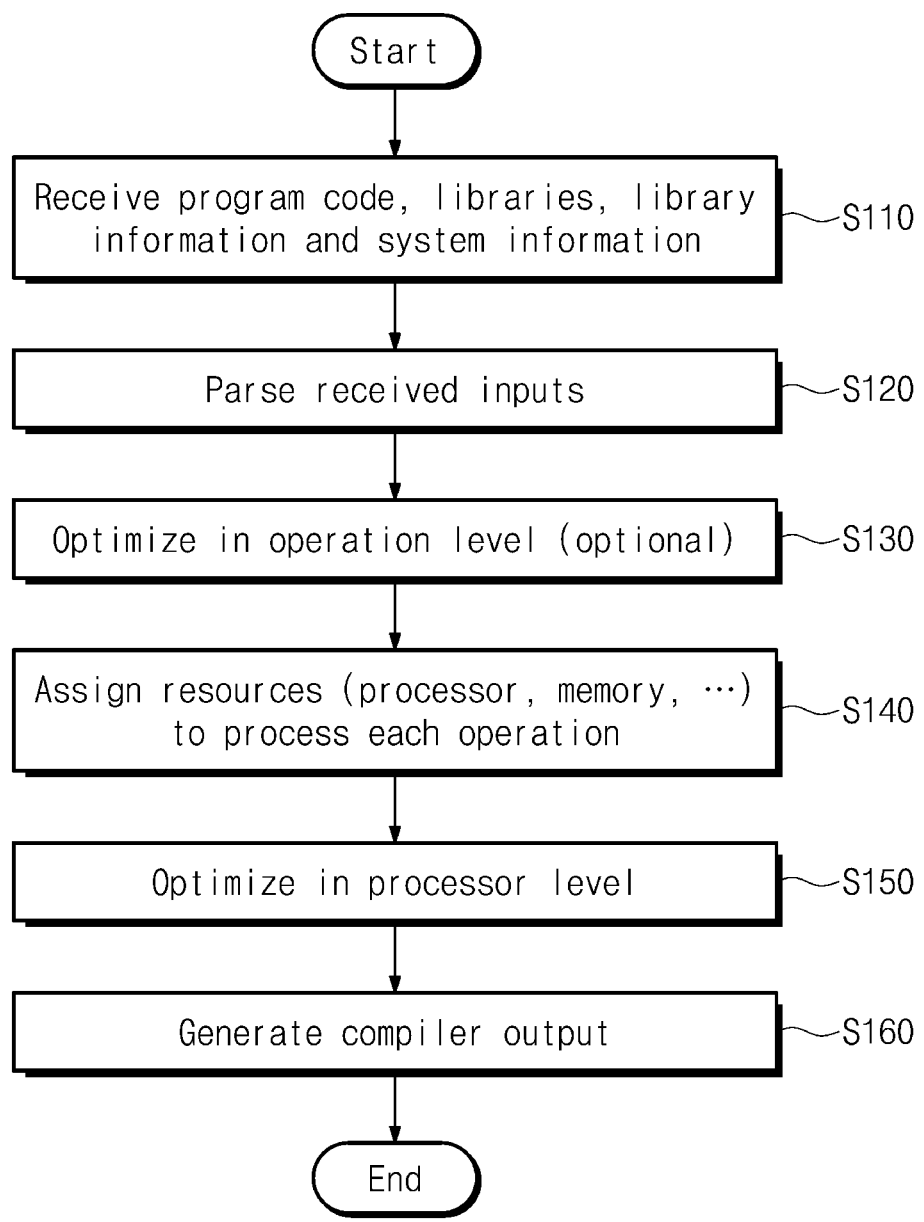
FIG. 10 is a flowchart for describing an example operation of a heterogeneous compiler of FIG. 5.
Figure 16:
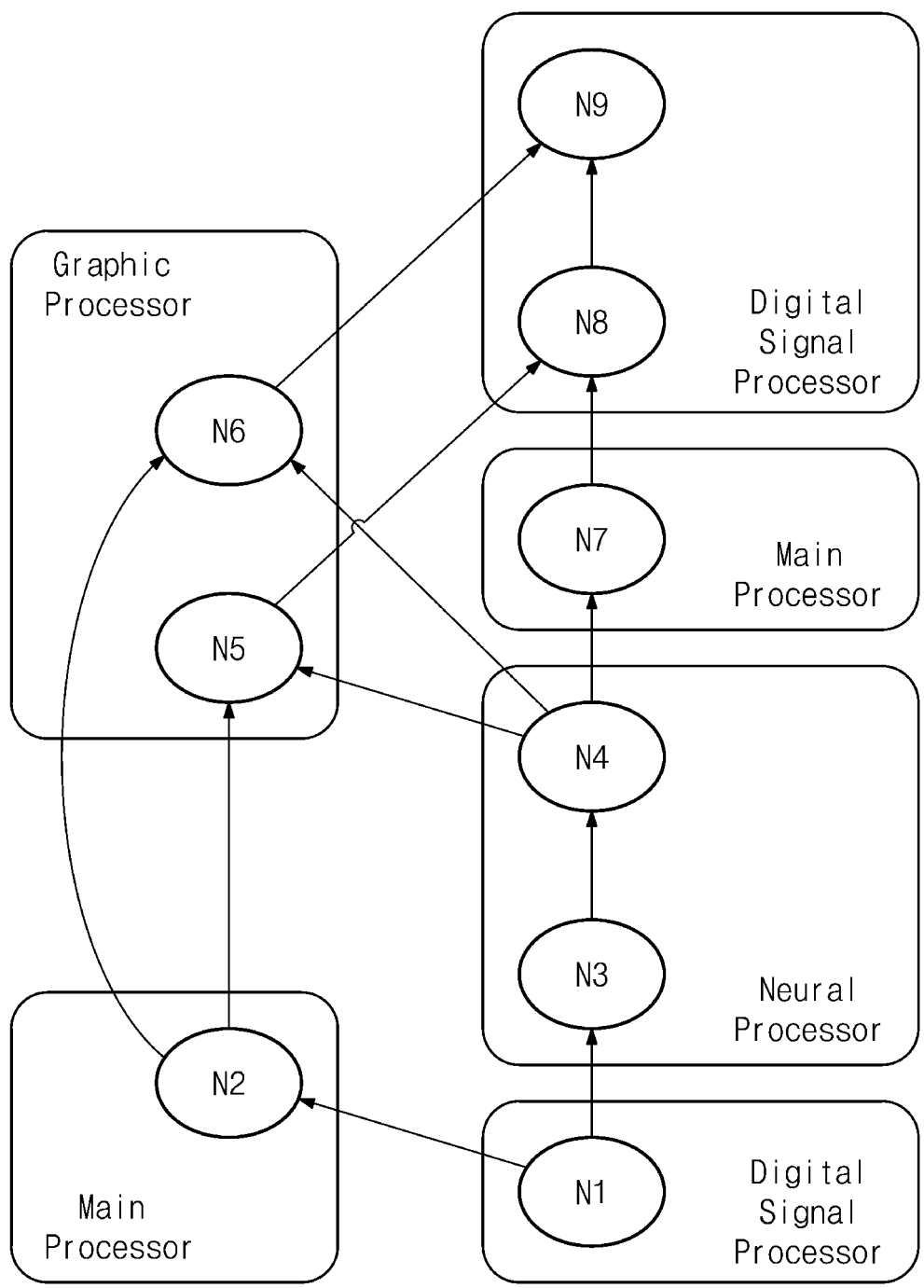
FIG. 16 is a conceptual diagram for describing example resource assignment by a heterogeneous compiler of FIG. 5.
Figure 17:
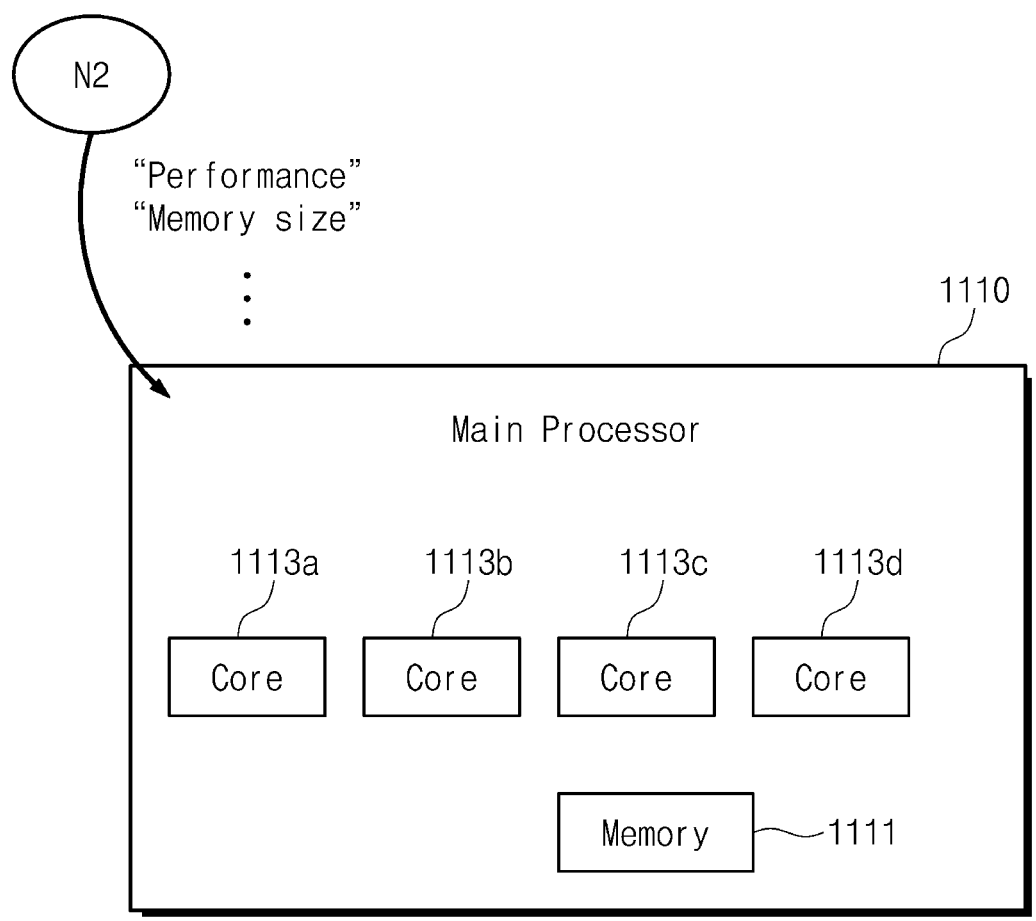
FIGS. 17 and 18 are conceptual diagrams for describing example processor level optimization by a heterogeneous compiler of FIG. 5.
Figure 18:
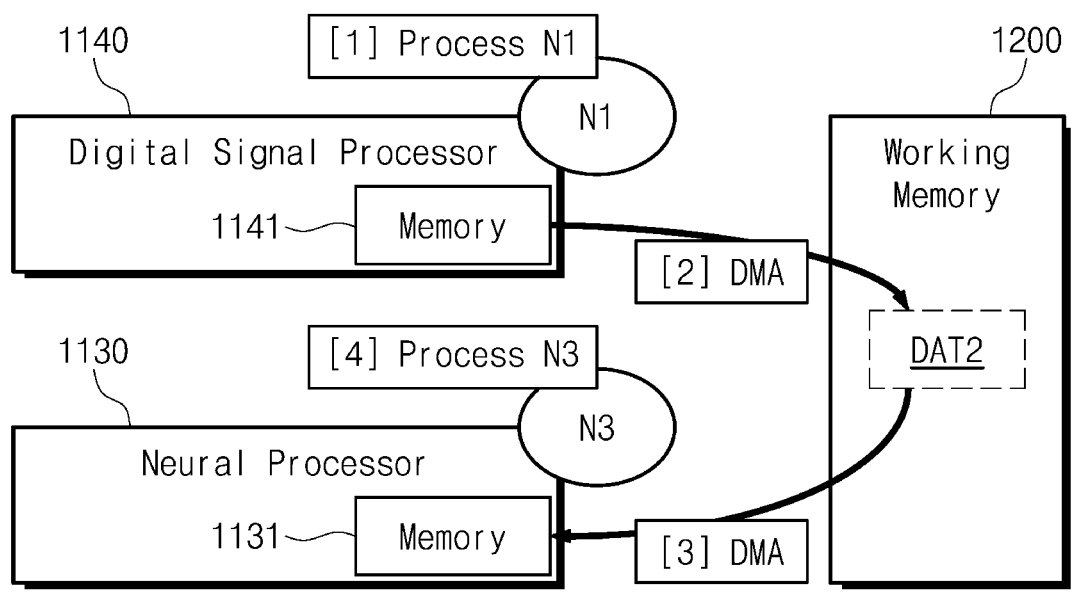
Figure 19:
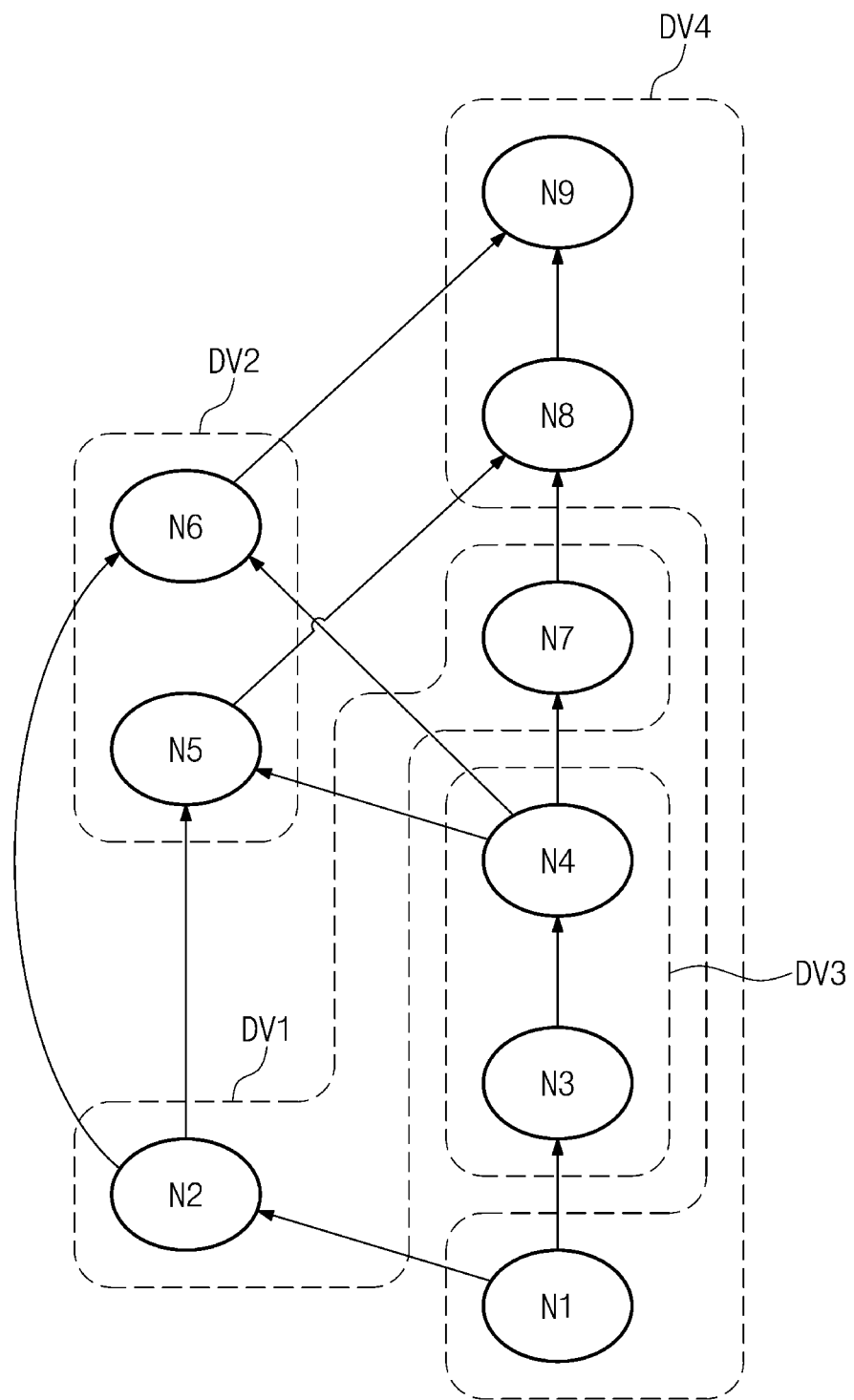

FIG. 10 is a flowchart describing an example operation of the heterogeneous compiler 3000 of FIG. 5. FIGS. 11 to 15 are conceptual diagrams for describing exemplary operation level optimization by the heterogeneous compiler 3000 of FIG. 5. FIG. 16 is a conceptual diagram for describing exemplary resource assignment by the heterogeneous compiler 3000 of FIG. 5. FIGS. 17 and 18 are conceptual diagrams for describing exemplary processor level optimization by the heterogeneous compiler 3000 of FIG. 5. FIGS. 19 and 20 are conceptual diagrams for describing an exemplary compile by the heterogeneous compiler 3000 of FIG. 5.

The development system 2000 or the electronic system 1000 may execute the heterogeneous compiler 3000 in response to a request of the designer, the developer, or the user or a request based on an operation policy. For example, the CPU 2110 or the main processor 1110 may execute the heterogeneous compiler 3000, but the present disclosure is not limited to this example.

When the heterogeneous compiler 3000 is executed, the heterogeneous compiler 3000 may receive one or more of the program code 3100, the libraries 3300, the library information 3350, and the system information 3500 (S110 of FIG. 10). As described with reference to FIGS. 6 to 9, the program code 3100, the libraries 3300, the library information 3350, and the system information 3500 may be prepared in advance as a compiler input before the heterogeneous compiler 3000 is executed.

The heterogeneous compiler 3000 may parse the received compiler input (S120 of FIG. 10). In the case where the program code 3100, the library information 3350, and the system information 3500 are written in a language comprehensible by the designer or the developer, the heterogeneous compiler 3000 may parse the compiler input for the purpose of comprehending the program code 3100, the library information 3350, and the system information 3500. In the case where the libraries 3300 are not compiled in form, the heterogeneous compiler 3000 may also parse the libraries 3300.

In some embodiments, the heterogeneous compiler 3000 may optimize an operation level (S130 of FIG. 10). The operation level may be optimized to process operations more efficiently and to operate the heterogeneous processors 1110, 1120, 1130, and 1140 more efficiently during a runtime when operations directed by the program code 3100 are actually processed by the heterogeneous processors 1110, 1120, 1130, and 1140.

Figure 11:
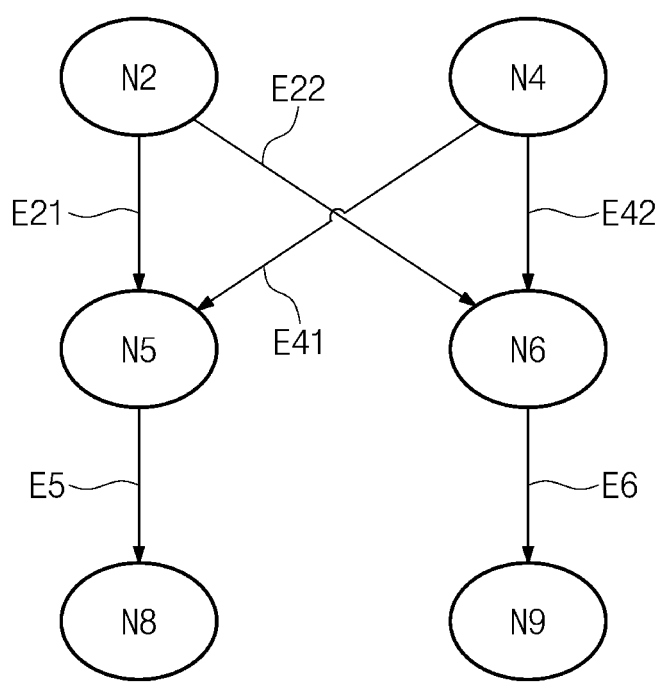
FIGS. 11 to 15 are conceptual diagrams for describing example operation level optimization by a heterogeneous compiler of FIG. 5.

For example, referring to FIGS. 7 and 11, outputs of operations corresponding to the nodes N2 and N4 may be used as inputs of operations corresponding to the nodes N5 and N6. In other words, the operations corresponding to the nodes N5 and N6 may use the same inputs or related inputs. For example, the operations corresponding to the nodes N5 and N6 may be convolution operations based on the same kernels, the same padding size, and the same stride size.

Figure 12:
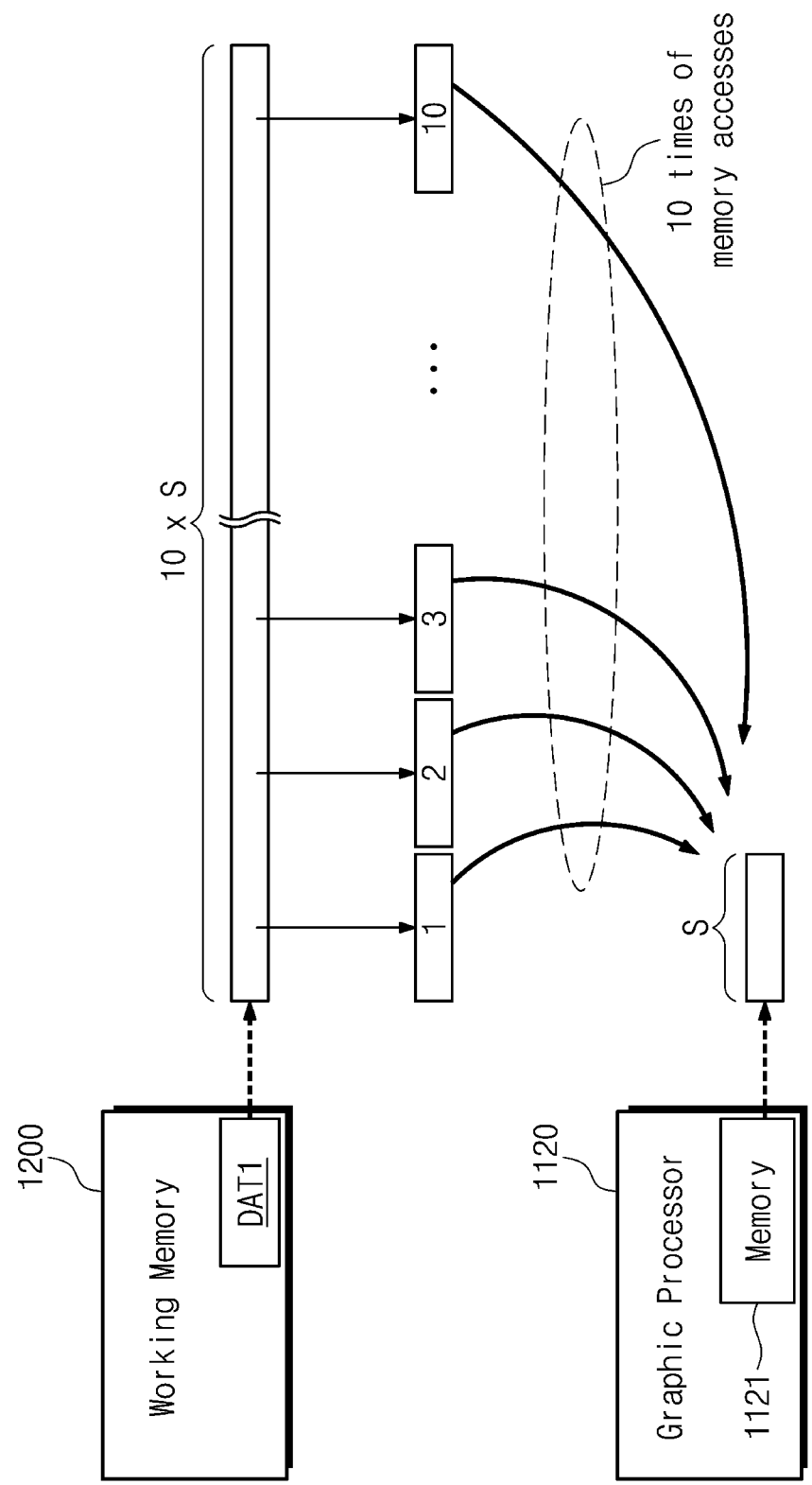
Figure 13:
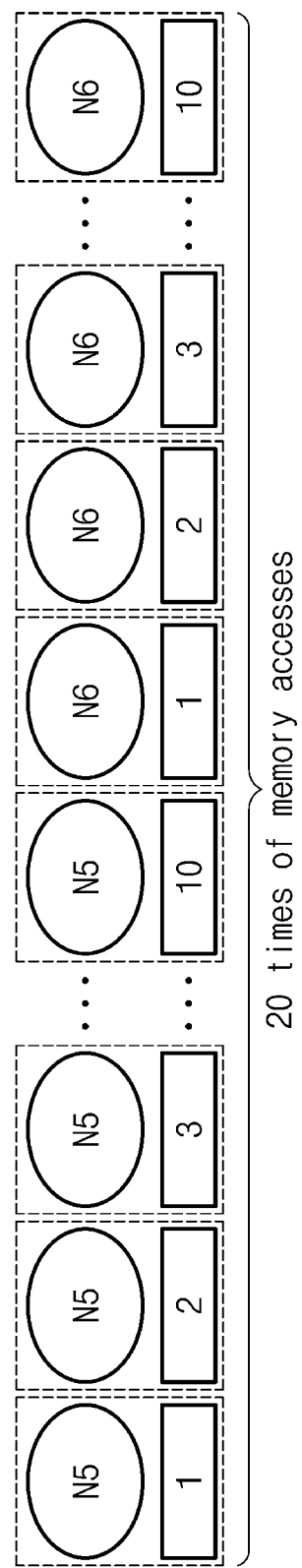

For example, referring to FIG. 12, output data DAT1 of the operations corresponding to the nodes N2 and N4 may be stored in the working memory 1200. For example, in the case where the graphic processor 1120 is selected to process the operations corresponding to the nodes N5 and N6, to use the data DAT1, the graphic processor 1120 may read the data DAT1 from the working memory 1200 and may store the read data DAT1 in the internal memory 1121.

Meanwhile, the size of the internal memory 1121 may be restricted, and a memory area having a memory size of "S" may be permitted to store the data DAT1. In contrast, the size of the data DAT1 may be ten times the memory size of the permitted memory area (i.e., "10×S"). In this case, 10 memory accesses may occur between the graphic processor 1120 and the working memory 1200, and in each memory access, partial data of the data DAT1 may be transferred from the working memory 1200 to the internal memory 1121.

The graphic processor 1120 may process the operations corresponding to the nodes N5 and N6 based on the partial data of the data DAT1 stored in the internal memory 1121. For example, referring to FIG. 13, in the case where the operation corresponding to the node N6 is processed after the operation corresponding to the node N5 is completed based on the partial data of the data DAT1, 20 memory accesses may occur between the graphic processor 1120 and the working memory 1200.

Figure 14:
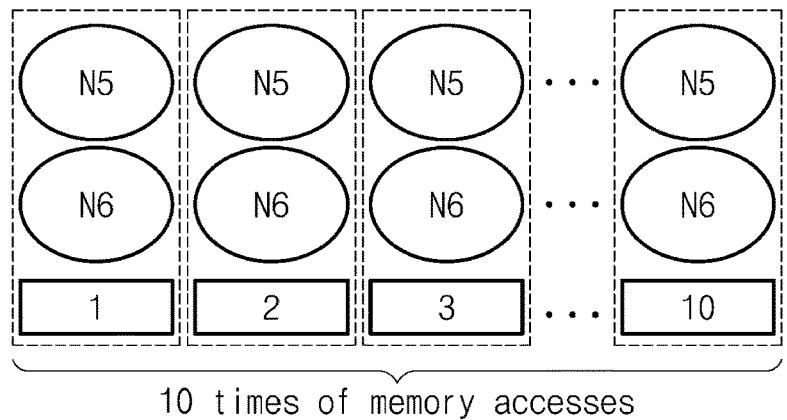

In contrast, referring to FIG. 14, in the case where the operations corresponding to the nodes N5 and N6 are processed by sharing the same memory access (e.g., in the case where next partial data of the data DAT1 are read after the operations corresponding to the nodes N5 and N6 are performed based on each partial data of the data DAT1), 10 memory accesses may occur between the graphic processor 1120 and the working memory 1200.

In the case where the number of memory accesses decreases, the efficiency of operations may be improved. For example, operations for a convolution neural network may be processed by using a considerably large amount of data. In the case where the amount of data is large, to decrease the number of memory accesses may be advantageous to improve the efficiency of operation.

Figure 15:
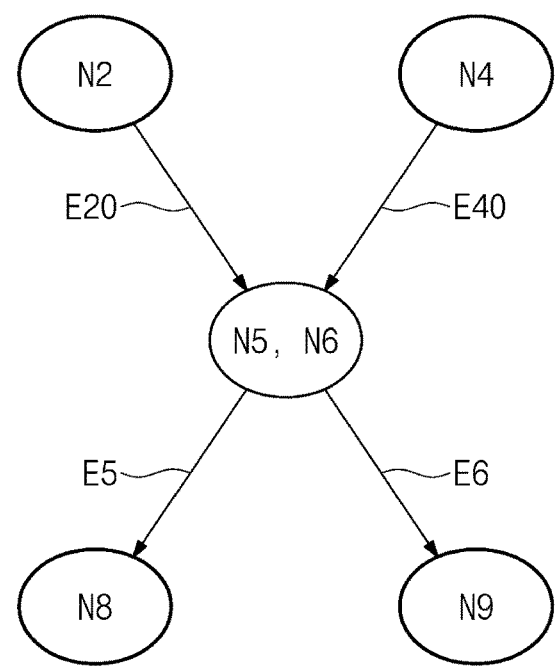

Accordingly, referring to FIG. 15, the heterogeneous compiler 3000 may reconfigure the operations corresponding to the nodes N5 and N6 such that the operations corresponding to the nodes N5 and N6 are processed by sharing the same memory access (operation level optimization). For example, the heterogeneous compiler 3000 may arrange a processing order of the operations corresponding to the nodes N5 and N6 such that the operations corresponding to the nodes N5 and N6 are processed based on second partial data of the data DAT1 after the operations corresponding to the nodes N5 and N6 are processed based on first partial data of the data DAT1.

In this example, the graph structure of FIG. 7 may be modified or changed such that an edge E20 is connected to the nodes N5 and N6 and an edge E40 is connected from the node N4 to the nodes N5 and N6. Meanwhile, even though the operations corresponding to the nodes N5 and N6 are reconfigured, the relationship between the edges E5 and E6 and the nodes N8 to N9 may not change.

The heterogeneous compiler 3000 may configure the operations corresponding to the nodes N5 and N6 such that a result of the operation corresponding to the node N5 and a result of the operation corresponding to the node N6 are stored in the internal memory 1121 independently of each other. Accordingly, an operation corresponding to the node N8 may be processed by using the result of the operation corresponding to the node N5, and an operation corresponding to the node N9 may be processed by using the result of the operation corresponding to the node N6.

The heterogeneous compiler 3000 may assign resources of the electronic system 1000 for the purpose of processing each operation directed by the program code 3100 (S140 of FIG. 10). For example, the heterogeneous compiler 3000 may determine whether any processor of the heterogeneous processors 1110, 1120, 1130, and 1140 processes each operation, whether any memory area of the working memory 1200 stores data for each operation, etc.

For example, referring to FIG. 16, the heterogeneous compiler 3000 may determine processors, which will process operations, from the heterogeneous processors 1110, 1120, 1130, and 1140. Accordingly, in the heterogeneous processors 1110, 1120, 1130, and 1140, each processor may be selected to process one or more operations assigned among the operations.

For example, operations corresponding to the nodes N1, N8, and N9 may be assigned to be processed by the digital signal processor 1140 and operations corresponding to the nodes N2 and N7 may be assigned to be processed by the main processor 1110. Operations corresponding to the nodes N3 and N4 may be assigned to be processed by the neural processor 1130, and the operations corresponding to the nodes N5 and N6 may be assigned to be processed by the graphic processor 1120.

In embodiments, the heterogeneous compiler 3000 may determine a process, which will process each operation, with reference to the library information 3350 (thus, in the consideration of attributes of processing operations by the heterogeneous processors 1110, 1120, 1130, and 1140). The heterogeneous compiler 3000 may determine a process, which will process each operation, based on information obtained from the library information 3350 such that one or more processing conditions for operations are optimized.

For example, the heterogeneous compiler 3000 may find a time necessary for each processor to process each operation, based on the library information 3350. In this example, the heterogeneous compiler 3000 may determine a processor, which will process each operation, based on optimizing a total time necessary to process the operations corresponding to the nodes N1 to N9.

For example, the heterogeneous compiler 3000 may find the amount of power to be consumed for each processor to process each operation, based on the library information 3350. In this example, the heterogeneous compiler 3000 may determine a processor, which will process each operation, based on minimizing the total amount of power to be consumed to process the operations corresponding to the nodes N1 to N9.

However, the above examples are provided for better understanding, not intended to limit the present disclosure. The heterogeneous compiler 3000 may determine a processor, which will process each operation, based on various optimization conditions such that the heterogeneous processors 1110, 1120, 1130, and 1140 process operations in an optimized manner.

For example, to determine whether an optimization condition is satisfied (e.g., whether the total time or the total power consumption is minimized), the heterogeneous compiler 3000 may calculate costs necessary to assign each operation to each processor with reference to the library information 3350. In some cases, the heterogeneous compiler 3000 may determine a processor, which will process each operation, based on a weighted sum of the costs calculated with regard to various optimization conditions.

In some embodiments, the heterogeneous compiler 3000 may determine a processor, which will process each operation, such that at least a part of the heterogeneous processors 1110, 1120, 1130, and 1140 operate in parallel for the purpose of processing operations. For example, even though the graphic processor 1120 is able to process the operation corresponding to the node N7 within the shortest time, the total time may be minimized when the operation corresponding to the node N7 is assigned to the main processor 1110 and the main processor 1110 and the graphic processor 1120 operate in parallel to process the operations corresponding to the nodes N5, N6, and N7.

As such, the heterogeneous compiler 3000 may further consider a parallel operation of the heterogeneous processors 1110, 1120, 1130, and 1140 for the purpose of determining a processor that will process each operation. The heterogeneous compiler 3000 may schedule a processor, which will process each operation, in advance before a runtime when operations are actually processed by the heterogeneous processors 1110, 1120, 1130, and 1140. In this case, the processing of operations may be distributed to the heterogeneous processors 1110, 1120, 1130, and 1140 such that the operations are efficiently processed. As a result, in the actual runtime, the performance and efficiency of the heterogeneous processors 1110, 1120, 1130, and 1140 may be improved.

In some embodiments, the heterogeneous compiler 3000 may not consider attributes (e.g., a processing time and power consumption) associated with the operations of the heterogeneous processors 1110, 1120, 1130, and 1140 in the actual runtime. Instead, the heterogeneous compiler 3000 may determine a processor, which will process each operation, with reference to the library information 3350 prepared in advance before the actual runtime. Accordingly, the heterogeneous compiler 3000 may provide a compiler output that is optimized in advance before the actual runtime.

Meanwhile, some operations may be processed only by a specific processor. These operations may be assigned to be processed by the specific processor.

The heterogeneous compiler 3000 may map each operation onto the determined processor of the heterogeneous processors 1110, 1120, 1130, and 1140 with reference to the library information 3350. Accordingly, in the actual runtime, each operation may be processed by the mapped processor. Mapping between operations and the processors 1110, 1120, 1130, and 1140 may be referenced to generate the compiler output 3700, which will be described below.

In addition to the processor assignment, the heterogeneous compiler 3000 may assign a memory area of the working memory 1200, in which data for each operation will be stored. The data for each operation may be stored in the assigned memory area, and thus may be accessed in the assigned memory area for use as an input of any other operation. Besides, the heterogeneous compiler 3000 may assign various resources (e.g., a bus and a cache) to be used to process operations.

In some embodiments, the heterogeneous compiler 3000 may optimize a processor level (S150 of FIG. 10). For example, attributes (e.g., the number of cores, performance, a size of an internal memory, an operating frequency, an operating voltage, a hardware circuit structure, and an architecture) of the respective heterogeneous processors 1110, 1120, 1130, and 1140 may be different. The heterogeneous compiler 3000 may reconfigure operations based on the attributes of the heterogeneous processors 1110, 1120, 1130, and 1140 with reference to the library information 3350 (processor level optimization).

For example, referring to FIG. 17, the operation corresponding to the node N2 may be assigned to be processed by the main processor 1110. The operation corresponding to the node N2 may be reconfigured based on attributes (e.g., performance and a memory size) of the main processor 1110.

For example, the operation corresponding to the node N2 may use data, the size of which is greater than the memory size of the internal memory 1111. In this case, the heterogeneous compiler 3000 may tile the operation corresponding to the node N2 such that the operation corresponding to the node N2 is processed based on partial data having a size allowable according to a memory size of the internal memory 1111. Here, the tiling may mean to schedule an operation so as to be repeatedly processed by using data of a smaller size, which may be understood to be similar to the descriptions given with reference to FIGS. 12 to 14.

For example, the main processor 1110 may include four cores 1113$a$ to 1113$d$. In this case, the operation corresponding to the node N2 may be processed in parallel on the cores 1113$a$ to 1113$d$. The heterogeneous compiler 3000 may reconfigure the operation corresponding to the node N2 such that the tiled operations are processed in parallel.

For example, the internal memory 1111 may store data associated with the operation corresponding to the node N2. In the case where the operation corresponding to the node N2 is completed, the data of the internal memory 1111 may be transferred to the working memory 1200. Afterwards, the memory area of the internal memory 1111 may become free or may be reused to store data of any other operation. The heterogeneous compiler 3000 may schedule assignment of the internal memory 1111.

For example, referring to FIG. 18, the working memory 1200 may be used to exchange data between the heterogeneous processors 1110, 1120, 1130, and 1140. Here, in the case where the heterogeneous processors 1110, 1120, 1130, and 1140 may access the working memory 1200 through the DMA without an intervention of the main processor 1110, efficiency may be improved.

For example, the digital signal processor 1140 may process the operation corresponding to the node N1 (operation [1]), and data DAT2 corresponding to a result of the processed operation may be stored in the working memory 1200 through the DMA (operation [2]). The neural processor 1130 may read the data DAT2 from the working memory 1200 through the DMA (operation [3]) and may process the operation corresponding to the node N3 based on the read data DAT2 (operation [4]).

The heterogeneous compiler 3000 may provide instructions and settings for permitting the DMA. For example, before the operation corresponding to the node N3 is processed after the operation corresponding to the node N1 is completed, the heterogeneous compiler 3000 may schedule memory allocation and memory accesses such that the DMA between the processors 1130 and 1140 and the working memory 1200 is permitted.

Besides, the heterogeneous compiler 3000 may optimize operations to be appropriate for various attributes of each of the heterogeneous processors 1110, 1120, 1130, and 1140. This processor level optimization may be based on the library information 3350 prepared in advance before compiling of the heterogeneous compiler 3000.

The heterogeneous compiler 3000 may generate the compiler output 3700 based on results of the operations described with reference to FIGS. 11 to 18 (S160 of FIG. 10). The heterogeneous compiler 3000 may compile the program code 3100 together with all or a part of the libraries 3300 for the purpose of generating the compiler output 3700.

Referring to FIG. 19, the heterogeneous compiler 3000 may divide the program code 3100 for the purpose of compiling the program code 3100. For example, the heterogeneous compiler 3000 may divide the whole portion of the program code 3100 into sub portions DV1 to DV4. The sub portions DV1 to DV4 may be divided from the whole portion of the program code 3100 so as to correspond to the heterogeneous processors 1110, 1120, 1130, and 1140, respectively.

Each of the sub portions DV1 to DV4 may direct one or more operations assigned to be processed by each processor of the heterogeneous processors 1110, 1120, 1130, and 1140.

For example, the sub portion DV1 may direct operations corresponding to the nodes N2 and N7 assigned to be processed by the main processor 1110.

As the heterogeneous compiler 3000 subdivides the program code 3100, the whole portion of the program code 3100 may be divided into the sub portions DV1 to DV4 respectively corresponding to the heterogeneous processors 1110, 1120, 1130, and 1140 based on one or more operations mapped onto each of the heterogeneous processors 1110, 1120, 1130, and 1140.

Referring to FIG. 20, the heterogeneous compiler 3000 may compile the sub portions DV1 to DV4 such that the sub portions DV1 to DV4 respectively correspond to some libraries, which are to be referenced by the heterogeneous processors 1110, 1120, 1130, and 1140 for the purpose of processing operations, from among the libraries 3300. For example, the heterogeneous compiler 3000 may compile the sub portion DV1 such that the sub portion DV1 corresponds to one or more libraries to be referenced by the main processor 1110 for the purpose of processing the operations corresponding to the nodes N2 and N7 assigned to be processed by the main processor 1110.

For example, the digital signal processor 1140 may refer to a first library for the purpose of processing the convolution operation and may refer to a second library for the purpose of processing the pooling operation. The neural processor 1130 may refer to a third library for the purpose of processing the convolution operation and may refer to a fourth library for the purpose of processing the pooling operation.

For example, in the case where operations corresponding to the node N1 are associated with the convolution operation and operations corresponding to the node N3 are associated with the pooling operation, without the second library and the third library, the heterogeneous compiler 3000 may compile the sub portion DV4 directing the convolution operation such that the sub portion DV4 corresponds to the first library and may compile the sub portion DV3 directing the pooling operation such that the sub portion DV3 corresponds to the second library.

In embodiments, the compiling of the heterogeneous compiler 3000 may use only some libraries to be referenced by the heterogeneous processors 1110, 1120, 1130, and 1140 for the purpose of processing operations, instead of using all the libraries 3300. The heterogeneous compiler 3000 may generate the compiler output 3700 by compiling the sub portions DV1 to DV4 such that the sub portions DV1 to DV4 correspond to the libraries to be referenced. Accordingly, the compiler output 3700 may include only optimized results, and may have a small data size.

V. Compiler Output from Heterogeneous Compiler

Figure 21:
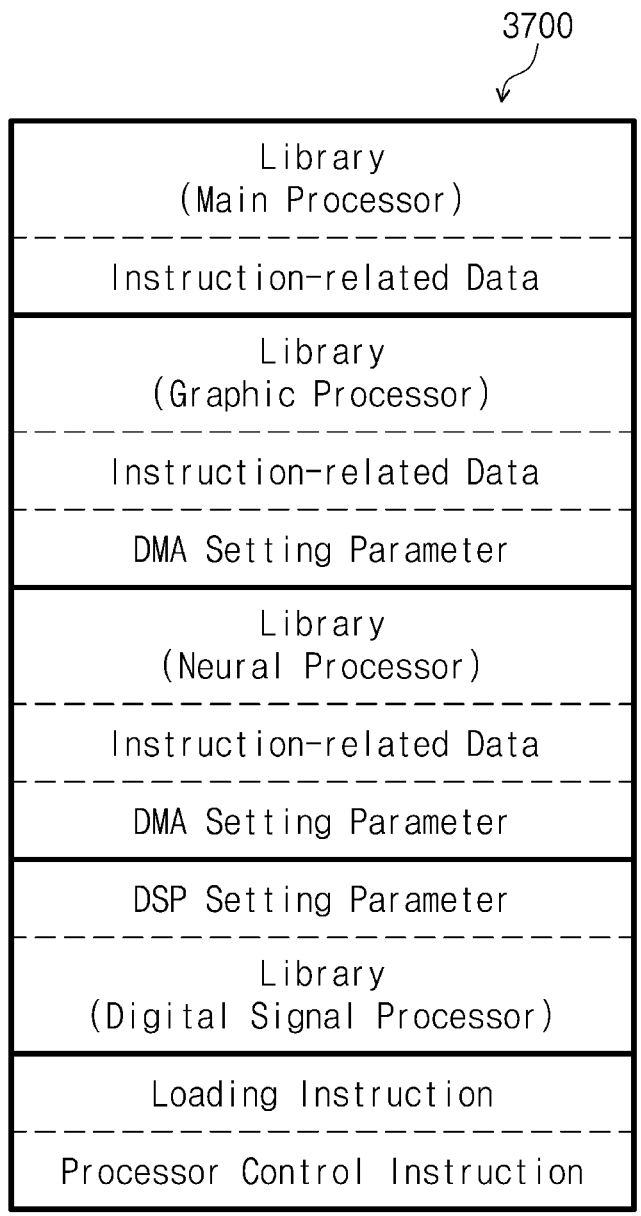
FIG. 21 is a conceptual diagram illustrating an example configuration of a compiler output generated from a heterogeneous compiler of FIG. 5.

FIG. 21 is a conceptual diagram illustrating an example configuration of the compiler output 3700 generated from the heterogeneous compiler 3000 of FIG. 5.

The compiler output 3700 may be a data structure including information necessary to process operations by the heterogeneous processors 1110, 1120, 1130, and 1140. The information included in the compiler output 3700 may be expressed in a format that is comprehensible by the heterogeneous processors 1110, 1120, 1130, and 1140.

The compiler output 3700 may include libraries to be referenced to process operations by each processor. The compiler output 3700 may include instruction-related data to be referenced to execute instructions of the libraries. For example, the instruction-related data may include various constants or a global common value (e.g., a kernel weight value for a convolution operation, a padding size, or a stride size). The compiler output 3700 may include correspondence relationships between the libraries and the instruction-related data with regard to each of the heterogeneous processors 1110, 1120, 1130, and 1140.

In some cases, an operating system or a framework of the electronic system 1000 may include all or a part of the libraries 3300 to be referenced by the heterogeneous processors 1110, 1120, 1130, and 1140. In this case, the compiler output 3700 may be generated without libraries and the heterogeneous compiler 3000 may not receive libraries included in the operating system or the framework of the electronic system 1000.

The compiler output 3700 may include setting parameters of the heterogeneous processors 1110, 1120, 1130, and 1140, which are necessary to process operations. For example, the compiler output 3700 may include parameters for setting operating conditions (e.g., circuit enable/disable, connection/disconnection between circuits, and an iterative operation count) of a processor (e.g., the digital signal processor 1140) implemented with a hardware accelerator.

For example, the compiler output 3700 may include setting parameters for supporting the DMA of each processor. For example, the DMA setting parameter may include various information for supporting the DMA, such as a flag directing that the DMA is permitted, a timing when the DMA is permitted, and an address of a memory area where the DMA is permitted.

Some processors may operate based on a control instruction such as firmware. The firmware may be used to operate a processor. For example, the firmware may be provided to set operating conditions of the processor or to control operations of the processor.

In some cases, firmware for a processor may not be installed, and to install firmware newly may be required. In some cases, to improve or change operating conditions or operations of a processor may be required, which is accomplished by modifying or updating the firmware.

The compiler output 3700 may include a loading instruction and a processor control instruction. The processor control instruction may include a new or changed instruction for installing, modifying, or updating the control instruction of the firmware. The loading instruction may be inserted to trigger the installation, modification, or update of the control instruction of the firmware based on the processor control instruction.

Figure 22:
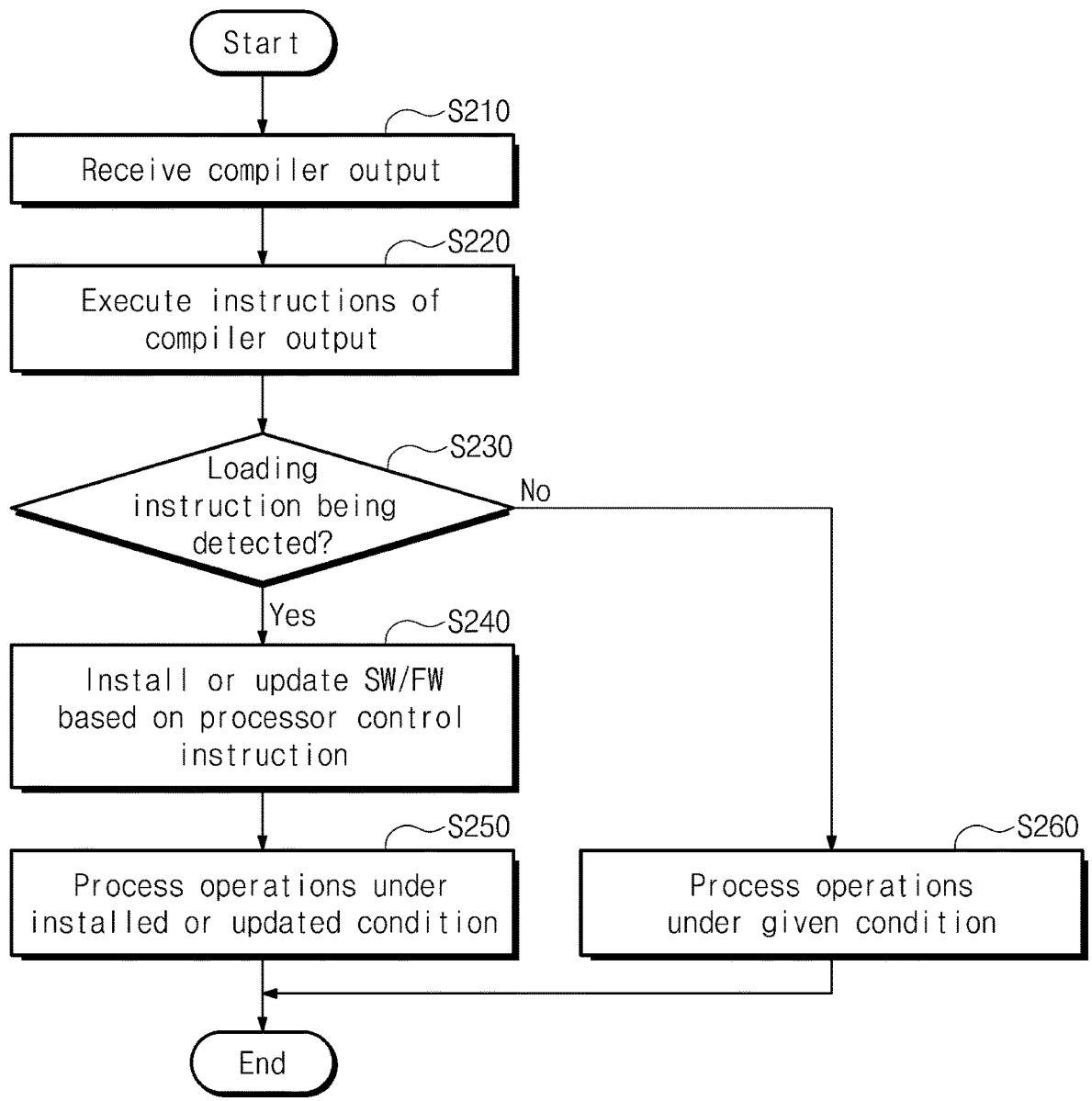
FIG. 22 is a flowchart for describing an example operation of modifying or updating a control instruction based on a compiler output of FIG. 21.

FIG. 22 is a flowchart for describing an example operation of modifying or updating a control instruction based on the compiler output 3700 of FIG. 21.

The electronic system 1000 may receive the compiler output 3700 (S210). A processor (e.g., the main processor 1110) of the electronic system 1000 may execute instructions of the compiler output 3700 (S220). First, the main processor 1110 may determine whether a loading instruction is detected from the compiler output 3700 (S230).

When the loading instruction is detected (Yes of S230), the main processor 1100 may recognize that the compiler output 3700 includes a program control instruction for installing, modifying, or updating software/firmware. In response to the detection of the loading instruction, the main processor 1110 may install, modify, or update software/firmware based on the processor control instruction of the compiler output 3700.

Accordingly, the heterogeneous processors 1110, 1120, 1130, and 1140 may process operations based on the new software/firmware under the installed or updated condition (S250). That is, to allow the heterogeneous processors 1110, 1120, 1130, and 1140 to process operations in a new condition, the main processor 1110 may detect the loading instruction to first complete the installation, modification, or update of the software/firmware.

In contrast, when the loading instruction is not detected (No of S230), software/firmware may not be installed, modified, or updated. Accordingly, the heterogeneous processors 1110, 1120, 1130, and 1140 may process operations under a given condition (S260).

An example configuration of the compiler output 3700 is described with reference to FIGS. 21 and 22, but the present disclosure is not limited thereto. The configuration of the compiler output 3700 may be variously changed or modified such that the compiler output 3700 may be used to process operations efficiently by the heterogeneous processors 1110, 1120, 1130, and 1140.

In addition, examples based on the graph structure 3100b of FIG. 7 are described with regard to FIGS. 10 to 22, but the present disclosure is not limited thereto. It may be well understood that the embodiments may be changed or modified to be applied with regard to any other program code (e.g., the program code 3100a written in a high-level language) in addition to the graph structure 3100b. For example, the heterogeneous compiler 3000 may analyze input-output relationships between modules (e.g., variables, classes, and functions) of the program code 3100a and may perform the operations described with reference to FIGS. 10 to 22 based on an analyzed result.

In addition, the above descriptions may provide examples associated with operations for a convolution neural network, but the present disclosure is not limited thereto. The embodiments may be adopted to any field requiring heterogeneous processors.

VI. Additional Implementations

Figure 23:
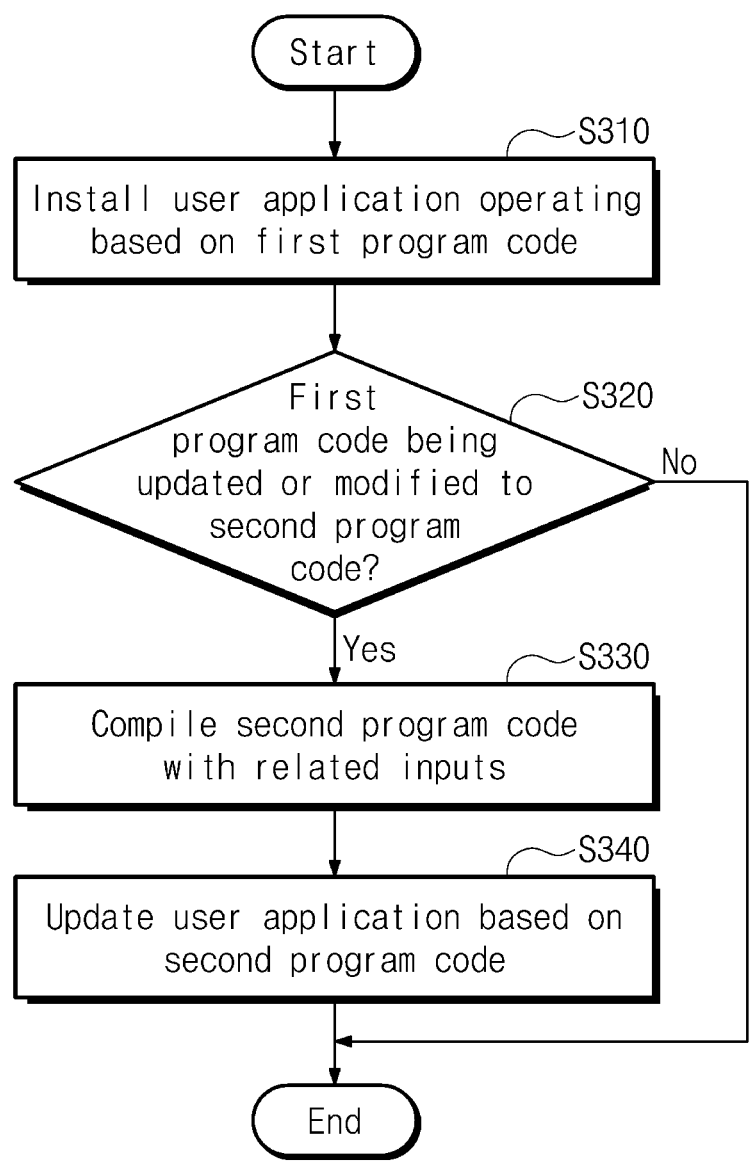
FIG. 23 is a flowchart describing an exemplary re-compile of a heterogeneous compiler of FIG. 5.

FIG. 23 is a flowchart describing an exemplary re-compile of the heterogeneous compiler 3000 of FIG. 5.

For example, a user application that operates based on a first program code may be installed in the electronic system 1000 (S310). Afterwards, the electronic system 1000 may determine whether the first program code is updated or modified to a second program code, for example, under control of the main processor 1110 (S320). For example, in the case where the user downloads a user application of a higher version, the first program code may be updated or modified to the second program code.

When the first program code is updated or modified to the second program code (Yes of S320), the heterogeneous compiler 3000 may compile the new second program code together with relevant inputs (e.g., a new library and new library information) (recompiling) (S330). Accordingly, the electronic system 1000 may update the user application based on the second program code, for example, under control of the main processor 1110 (S340). In contrast, when the first program code is not updated or modified to the second program code (No of S320), the heterogeneous compiler 3000 may not perform recompiling.

A description is given as the heterogeneous compiler 3000 performs recompiling when the first program code is updated or modified to the second program code, but the present disclosure is not limited thereto. The recompiling may be variously changed or modified to be performed when a new processing condition is required with regard to operations (e.g., when a pattern of data that are input to a convolution neural network changes or when configurations of heterogeneous processors change).

Figure 24:
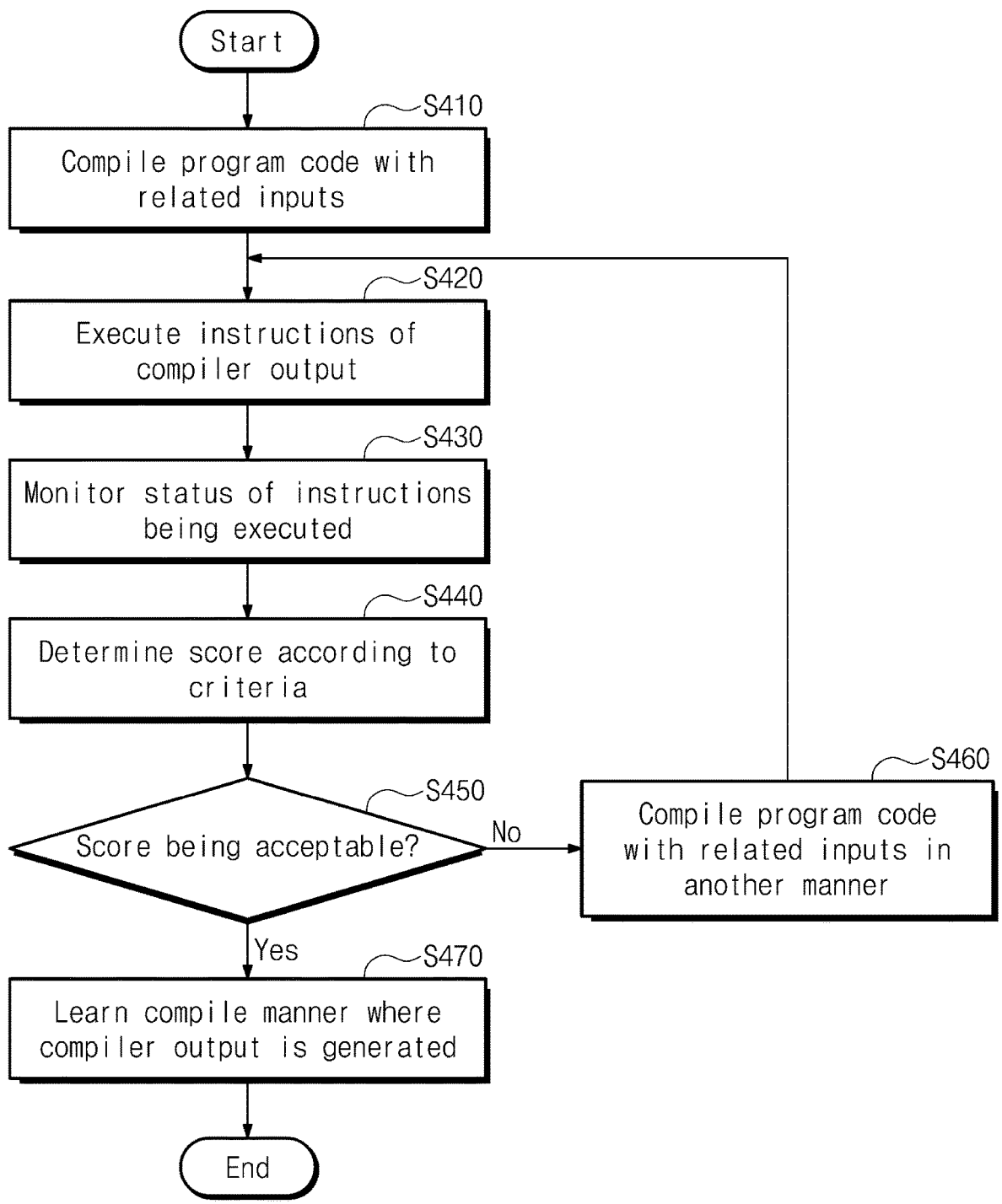
FIG. 24 is a flowchart describing example training for a heterogeneous compiler of FIG. 5.

FIG. 24 is a flowchart describing exemplary training for the heterogeneous compiler 3000 of FIG. 5.

The heterogeneous compiler 3000 may compile the program code 3100 together with relevant inputs in a first manner (S410) and may generate the compiler output 3700. The heterogeneous processors 1110, 1120, 1130, and 1140 of the electronic system 1000 may execute instructions of the compiler output 3700 (S420). The electronic system 1000 may monitor an execution status of instructions of the compiler output 3700, for example, under control of the main processor 1110 (S430).

The heterogeneous compiler 3000 may determine a score of the monitored execution status according to a given criteria (S440). For example, the heterogeneous compiler 3000 may determine a score, based on whether operations are processed within a reference time or whether operations consume a power smaller than a reference power.

When the score is not acceptable (No of S450), the heterogeneous compiler 3000 may compile the program code 3100 together with the relevant inputs in a second manner different from the first manner (S460). Afterwards, operation S420 to operation S450 may be performed on a new compiler output.

When the score is acceptable (Yes of S450), the heterogeneous compiler 3000 may learn a manner where the compiler output 3700 is generated (S470). For example, the heterogeneous compiler 3000 may store information of the learned manner in a memory (e.g., the working memory 1200 or a nonvolatile memory of the storage device 1300) such that the information of the learned manner may be later referenced. Through the learning, the heterogeneous compiler 3000 may gradually improve a compiler manner.

In embodiments, a processor may implement a heterogeneous compiler for generating a compiler output, which enables appropriate operations under a given system condition, with reference to libraries and library information configured to be appropriate for heterogeneous processors. According to the embodiments, a library and library information may be newly written or may be modified/updated, and thus, it may be possible to flexibly cope with a change in heterogeneous processors without modification of the heterogeneous compiler and design flexibility and expandability for the heterogeneous processors may be provided.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

The above descriptions are intended to provide example configurations and operations for implementing the present disclosure. The present disclosure may include implementations which may be obtained by simply changing or modifying the above embodiments, in addition to the above-described embodiments. Also, the present disclosure may include implementations which may be accomplished by changing or modifying the above-described embodiments easily in the future.

What is claimed is:

1. A method implemented by a processor of an electronic device, the method comprising:
  receiving a program code directing first operations to be processed by heterogeneous processors;
  receiving libraries to be referenced by the heterogeneous processors for processing the first operations;
  receiving library information including information associated with the first operations to be processed based on the libraries, and information associated with attributes of processing the first operations based on the libraries;
  determining processors, which will process the first operations, from the heterogeneous processors with reference to the library information such that each processor of the heterogeneous processors processes one or more assigned operations of the first operations; and
  compiling sub portions such that the sub portions correspond to some libraries respectively, the sub portions being divided from a whole portion of the program code so as to correspond to the determined processors respectively, the some libraries being to be referenced by the determined processors to process assigned operations among the libraries.

2. The method of claim 1, wherein the first operations include a convolution operation and a pooling operation for a convolution neural network.

3. The method of claim 1, wherein each of the libraries includes instructions executed by one of the heterogeneous processors to process one of the first operations.

4. The method of claim 1, wherein the receiving of the library information includes receiving the library information in a one-to-one correspondence to each of the libraries.

5. The method of claim 1, wherein the library information includes information of a type of an operation to be processed with reference to each of the libraries, information of an amount of power to be consumed to process the operation with reference to each of the libraries, and information of a time to be taken to process the operation with reference to each of the libraries.

6. The method of claim 5, wherein the determining of the processors, which will process the first operations, from heterogeneous processors is based on:
  minimizing a total amount of power to be consumed while processing the first operations in consideration of the amount of power consumed while processing the operation with reference to each of the libraries, or
  minimizing a total time to be taken to process the first operations in consideration of the time to be taken to process the operation with reference to each of the libraries.

7. The method of claim 1, wherein the determining of the processors, which will process the first operations, from heterogeneous processors includes mapping each operation of the first operations onto one of the heterogeneous processors with reference to the library information such that each of the first operations is processed by a mapped processor among the heterogeneous processors.

8. The method of claim 1, wherein the determining of the processors, which will process the first operations, from heterogeneous processors is based on the library information without considering attributes associated with runtime-operations of the heterogeneous processors in an actual runtime.

9. The method of claim 1, further comprising:
  receiving system information including information associated with attributes of the heterogeneous processors; and
  reconfiguring the first operations based on attributes of the determined processors, with reference to the system information.

10. The method of claim 9, wherein the system information includes information of a kind, performance, and a size of an internal memory of each of the heterogeneous processors.

11. The method of claim 9, wherein the reconfiguring of the operations includes tiling the one or more assigned operations of the first operations such that the one or more assigned operations are processed based on data having a size allowable according to a size of an internal memory of the each of the heterogeneous processors.

12. The method of claim 1, wherein each of the sub portions directs the one or more assigned operations assigned to be processed by each processor of the processors.

13. The method of claim 1, wherein the compiling sub portions such that the sub portions correspond to the some libraries respectively includes compiling each sub portion of the sub portions such that the each sub portion corresponds to one or more libraries, the one or more libraries referenced by each processor among the determined processors to process the one or more assigned operations, the one or more assigned operations being assigned to be processed by the each processor among the determined processors.

14. The method of claim 1, further comprising:
  compiling the sub portions to generate a compiler output such that the sub portions correspond to the some libraries respectively, wherein
  the compiler output includes the some libraries, data to be referenced to execute instructions of the some libraries, and setting parameters for the determined processors for processing the operations.

15. A processor for operating an electronic device, wherein the processor executes instructions of a heterogeneous compiler stored in a memory to:
  map operations onto heterogeneous processors in consideration of attributes of processing the operations by the heterogeneous processors, such that each of the operations is processed by a mapped processor of the heterogeneous processors;
  divide a whole portion of a program code into sub portions, the program code directing the operations to be processed by the heterogeneous processors, the sub portions respectively corresponding to the heterogeneous processors based on one or more operations, the one or more operations being mapped onto each of the heterogeneous processors; and
  compile the sub portions such that the sub portions correspond to libraries respectively, the libraries being to be referenced by the heterogeneous processors to process the operations.

16. The processor of claim 15, wherein mapping of the operations onto the heterogeneous processors is based on library information input to the processor before an actual runtime, without considering attributes associated with operations of the heterogeneous processors in the actual runtime.

17. The processor of claim 16, wherein the library information includes information of amounts of power expected to be consumed to process the operations by the heterogeneous processors and information of times expected to be taken to process the operations by the heterogeneous processors.

18. The processor of claim 15, wherein:
a first processor among the heterogeneous processors refers to a first library and a second library to process a first operation and a second operation among the operations,
a second processor among the heterogeneous processors refers to a third library and a fourth library to process the first operation and the second operation, and
when the first operation is mapped onto the first processor and the second operation is mapped onto the second processor, without the second library and the third library, the processor compiles a first sub portion of the program code such that the first sub portion corresponds to the first library, the first sub portion directing the first operation, and compiles a second sub portion of the program code such that the second sub portion corresponds to the fourth library, the second sub portion directing the second operation.

19. A method which is implemented by a processor of an electronic device, the method comprising:
receiving a program code directing operations to be processed by heterogeneous processors;
compiling sub portions such that the sub portions correspond to libraries in a first manner, the libraries being to be referenced by the heterogeneous processors to process the operations, the sub portions being divided from a whole portion of the program code so as to correspond to the heterogeneous processors respectively based on one or more operations among the operations, the one or more operations being assigned to each of the heterogeneous processors such that the each of the heterogeneous processors processes the one or more operations among the operations; and
compiling the sub portions such the sub portions correspond to the libraries in the first manner respectively, to generate a first compiler output such that at least a part of the heterogeneous processors operate in parallel to process the operations.

20. The method of claim 19, wherein the first compiler output includes:
a first instruction for modifying or updating a control instruction, the control instruction being used to operate one or more processors among the heterogeneous processors, and
a second instruction for triggering the modification or the update of the control instruction, the modification or the update being based on the first instruction.

* * * * *